(12) United States Patent
Truthseeker

(10) Patent No.: US 11,047,599 B2
(45) Date of Patent: Jun. 29, 2021

(54) ARRAY INCLUDING FRAMELESS SOLAR MODULES

(71) Applicant: TECSI Solar, Inc., El Sobrante, CA (US)

(72) Inventor: Samuel Marcus-Flack Truthseeker, El Sobrante, CA (US)

( * ) Notice: Subject to any disclaimer, the term of this patent is extended or adjusted under 35 U.S.C. 154(b) by 0 days.

(21) Appl. No.: 16/087,531

(22) PCT Filed: Mar. 25, 2017

(86) PCT No.: PCT/US2017/024196
§ 371 (c)(1),
(2) Date: Sep. 21, 2018

(87) PCT Pub. No.: WO2017/165874
PCT Pub. Date: Sep. 28, 2017

(65) Prior Publication Data
US 2020/0132339 A1    Apr. 30, 2020

Related U.S. Application Data

(60) Provisional application No. 62/313,375, filed on Mar. 25, 2016.

(51) Int. Cl.
*F24S 25/634* (2018.01)
*H02S 20/23* (2014.01)
(Continued)

(52) U.S. Cl.
CPC ............. *F24S 25/634* (2018.05); *F24S 25/33* (2018.05); *F24S 25/617* (2018.05); *H02S 20/23* (2014.12);
(Continued)

(58) Field of Classification Search
CPC ......... Y02E 10/47; Y02E 10/50; H02S 20/23; H02S 20/24; F24S 25/33; F24S 25/61;
(Continued)

(56) References Cited

U.S. PATENT DOCUMENTS

| 9,166,522 B1* | 10/2015 | Zvanut ................... F24S 25/61 |
| 2011/0088740 A1* | 4/2011 | Mittan .................... F24S 25/33 |
| | | 136/244 |

(Continued)

FOREIGN PATENT DOCUMENTS

| WO | 2009150466 A2 | 12/2009 |
| WO | 2011046578 A1 | 4/2011 |

OTHER PUBLICATIONS

International Search Report and Written Opinion received in International Patent Application No. PCT/US2017/024196, dated Sep. 25, 2017, in 16 pages.

*Primary Examiner* — Mayla Gonzalez Ramos
(74) *Attorney, Agent, or Firm* — Armstrong Teasdale LLP

(57) ABSTRACT

A solar array is mounted on a surface of a structure, the surface being generally planar. The solar array comprises a solar module and a support that supports the solar module a distance above the surface. The support defines a channel to receive the solar module. A locking mechanism engages the support to secure the solar module to the support, wherein the solar module extends between the support and the locking mechanism and into the channel such that the solar module is allowed to move relative to the support in a first plane generally parallel to the surface when the solar module is secured to the support. The locking mechanism and the support inhibit movement of the solar module in a second plane generally perpendicular to the surface when the solar module is secured to the support.

24 Claims, 21 Drawing Sheets

(51) Int. Cl.
  *F24S 25/33*    (2018.01)
  *F24S 25/617*   (2018.01)
  *F24S 25/00*    (2018.01)

(52) U.S. Cl.
  CPC ...... *F24S 2025/014* (2018.05); *F24S 2025/02* (2018.05)

(58) Field of Classification Search
  CPC .. F24S 25/617; F24S 25/634; F24S 2025/014; F24S 2025/02
  See application file for complete search history.

(56) References Cited

U.S. PATENT DOCUMENTS

| | | | |
|---|---|---|---|
| 2012/0061337 A1 | 3/2012 | Seery et al. | |
| 2012/0272613 A1* | 11/2012 | Cusson | F24S 25/35 52/745.2 |
| 2013/0087186 A1* | 4/2013 | Pelman | H01L 31/02 136/251 |
| 2013/0118099 A1* | 5/2013 | Scanlon | H02S 20/22 52/173.3 |
| 2013/0140416 A1 | 6/2013 | West et al. | |
| 2014/0061396 A1 | 3/2014 | Magno, Jr. et al. | |
| 2014/0158184 A1* | 6/2014 | West | H01L 31/048 136/251 |
| 2016/0336895 A1* | 11/2016 | Wildes | H02S 20/10 |
| 2017/0373632 A1* | 12/2017 | Bauer | F16B 5/125 |
| 2019/0006983 A1* | 1/2019 | Goldberg | H02S 30/10 |

\* cited by examiner

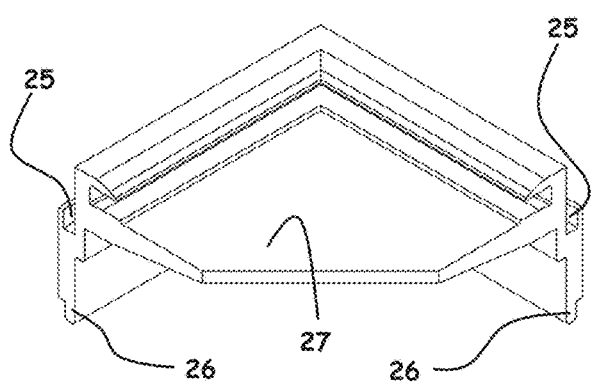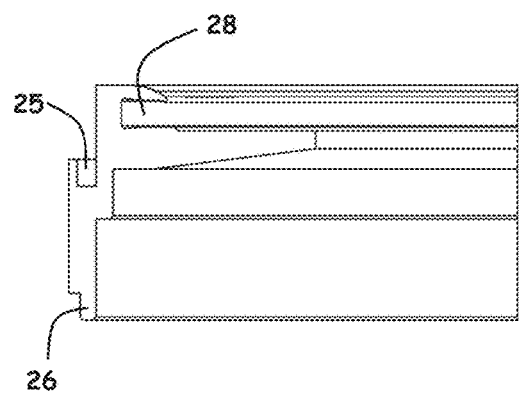
FIG. 9A
FIG. 9B
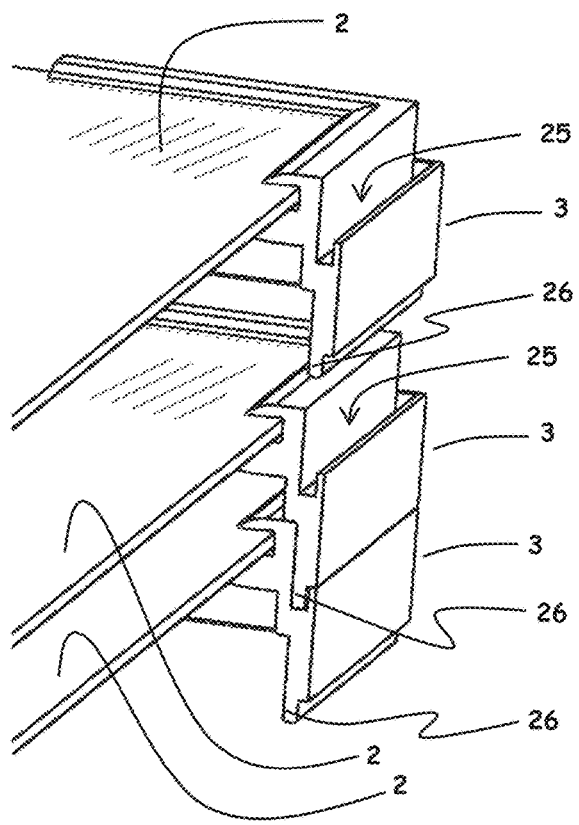
FIG. 9C

FIG. 10A                                FIG. 10B

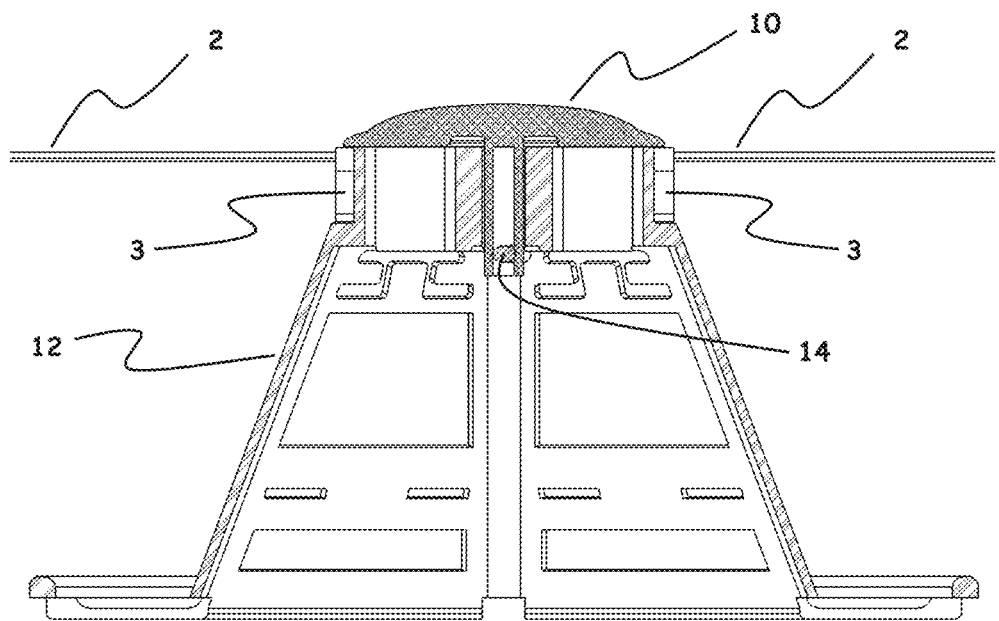
FIG.11B Section A-A
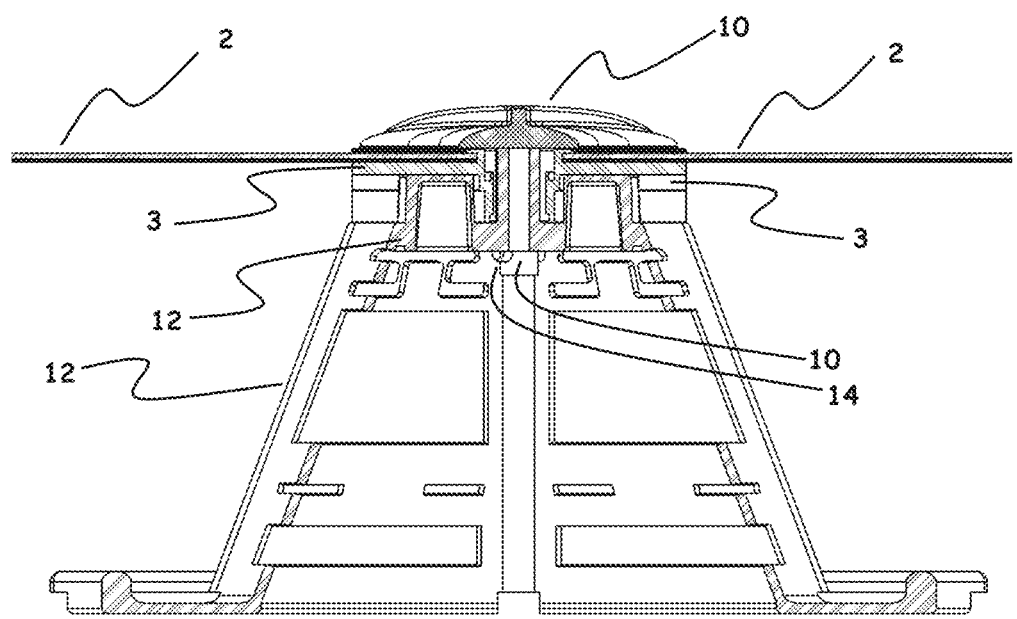
FIG.11C Section B-B

FIG.11D Section C-C

ARRAY INCLUDING FRAMELESS SOLAR MODULES

CROSS REFERENCE TO RELATED APPLICATIONS

This application is a National Stage application of International Application No. PCT/US2017/024196, filed on Mar. 25, 2017, which claims priority to U.S. Provisional Application No. 62/313,375, filed 25 Mar. 2016, the entire contents and disclosures of which are hereby incorporated by reference in their entirety.

FIELD

This disclosure generally relates to solar arrays and, more specifically, to a solar array including frameless solar modules.

BACKGROUND

Solar modules convert solar energy into other forms of useful energy (e.g., electricity or thermal energy). Such modules are typically positioned above an underlying structure surface on a frame or rack. The solar modules are often connected and arranged to form an array. However, the solar modules and/or the structure surface may move relative to each other, which causes stress in the solar modules. In addition, the solar modules may experience loads and environmental forces such as wind, snow, ice, and precipitation.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a solar array is mounted on a surface of a structure, the surface being generally planar. The solar array comprises a solar module and a support that supports the solar module a distance above the surface. The support defines a channel to receive the solar module. A locking mechanism engages the support to secure the solar module to the support, wherein the solar module extends between the support and the locking mechanism and into the channel such that the solar module is allowed to move relative to the support in a first plane generally parallel to the surface when the solar module is secured to the support. The locking mechanism and the support inhibit movement of the solar module in a second plane generally perpendicular to the surface when the solar module is secured to the support.

In another aspect, a method of assembling frameless solar modules, the method comprising attaching a first set of clips to a first laminate, securing the first set of clips on the first laminate in a position, attaching a second set of clips on the second laminate, and stacking the second laminate on the first laminate such that the first set of clips engage the second set of clips. The first set of clips and the second set of clips align when the second laminate is stacked on the first laminate.

In still another aspect, a solar array for mounting on a surface of a structure comprises solar modules and supports to support the solar modules above the surface. Each support includes a keyway. Keys secure the solar modules to the supports and each key extends into the keyway and engages the respective support. Each key has an unlocked position in which the key is inserted into the keyway and a locked position in which the key extends into the keyway and secure the solar modules to the respective support.

In yet another aspect, a solar array is positioned on a surface of a structure and comprises a solar module and a pylon that supports the solar module a distance above the surface. The support defines a wire receiver to secure wires to the support, the wire receiver including at least one slot and a cleat extending across the at least one slot.

In another aspect, a solar array is mounted on a surface of a structure and comprises a solar module including a laminate and is substantially frameless. Clips are attached to the laminate and a support supports the solar module a distance above the surface. The support defines a channel configured to receive the clips, and a locking mechanism is engageable with the support to secure the solar module to the support. The clips extend between the support and the locking mechanism and into the channel.

In still another aspect, an assembly of solar modules comprises a first solar module including a first set of clips and a second solar module including a second set of clips. The first set of clips engages the set of clips, the first set of clips and the second set of clips facilitating assembly, shipping and installation of the solar modules.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 9A is a perspective view of a corner clip;

FIG. 9B is a side view of the corner clip;

FIG. 9C is an enlarged perspective view of the corner clips of stacked modules.

FIG. 10A is a perspective view of a side clip;

FIG. 10B is a side view of the side clip;

FIG. 11B is a cross section view of the array shown in FIGS. 1A and 11A taken along section line A-A;

FIG. 11C is a cross section view of the array shown in FIGS. 1A and 11A taken along section line B-B;

FIG. 11D is a cross section view of the array shown in FIGS. 1A and 11A taken along section line C-C;

Like reference symbols in the various drawings indicate like elements.

DETAILED DESCRIPTION

The term photovoltaic may be abbreviated as "PV". As used herein, the term "PV laminate" refers to any laminate that may be used to generate electricity from solar rays. The term "PV module" or "module assembly" refers to a PV laminate. The PV module may include mounting structure such as a frame and/or discrete mounting elements. The term "PV array" refers to a group of PV modules assembled as part of the same electricity generation system.

Embodiments described below include photovoltaic (PV) modules and mounting systems for the PV modules. For example, some embodiments include PV modules coupled together into a contiguous and interlocked ballasted array. The PV modules may be mounted to a surface (such as a roof) such that the modules are free to move in a plane parallel to the surface. As a result, the surface and/or the PV modules may expand or contract independently of the other. The PV modules may be supported on the surface by a support system. The support system for the PV modules translates with the roof's expansion and allows the PV modules to move independently within a controlled capture mechanism of the support system. The PV modules may be installed manually without the use of tools and without the need for electrical bonding between modules. Some embodiments of the described system include a built-in wire management device, ballast retention mechanism, and/or wind deflectors.

Figure 1A:
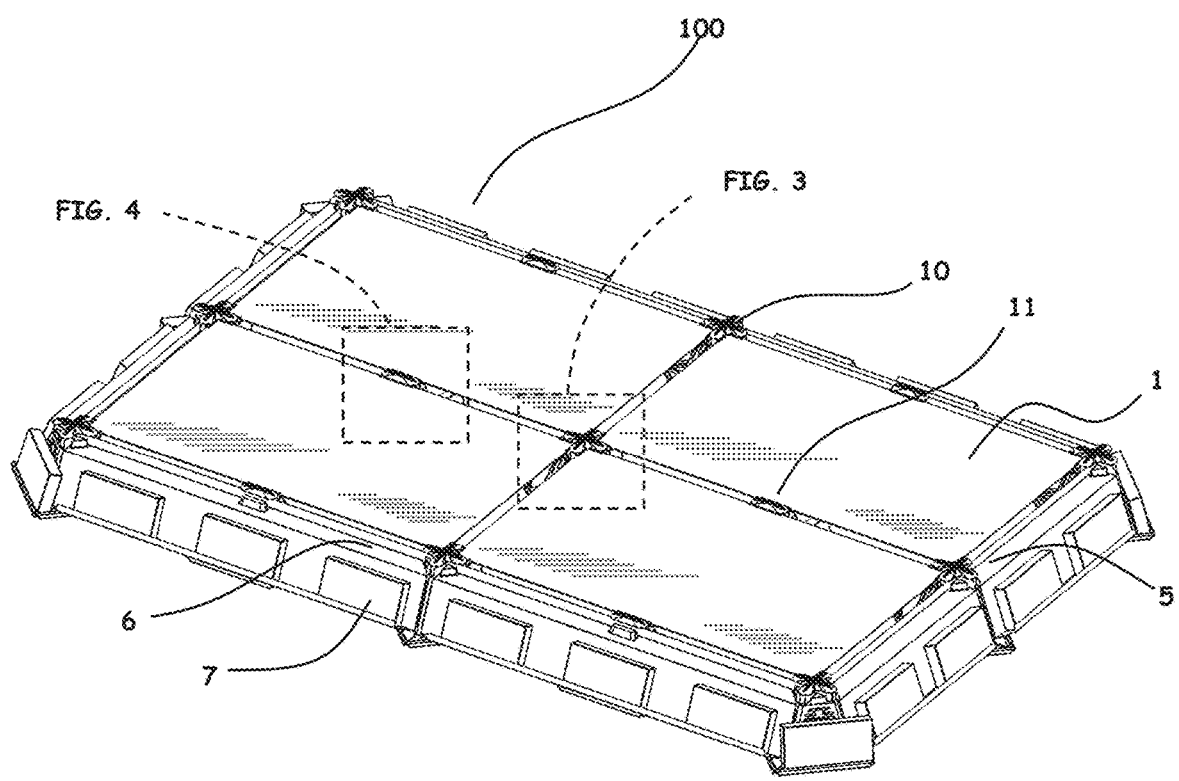
FIG. 1A is a perspective view of a solar array.
Figure 1B:
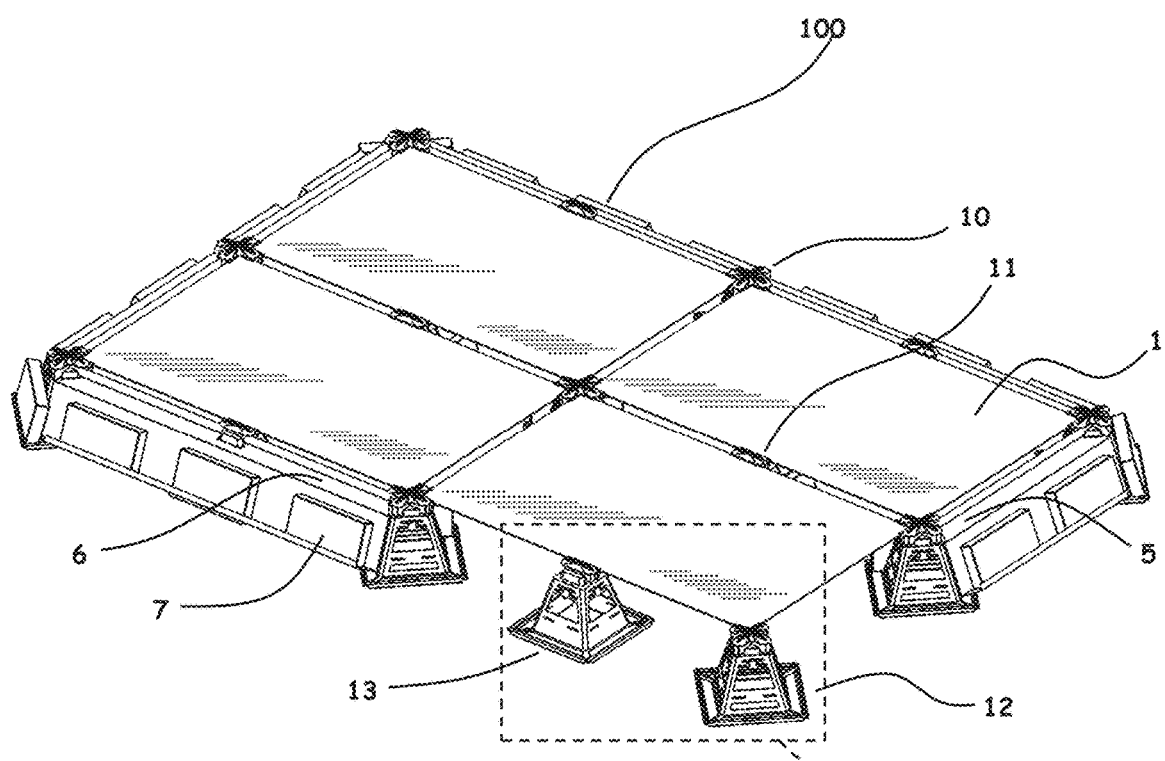
FIG. 1B is a perspective view of the solar array shown in FIG. 1A with wind deflectors and ballast removed.
Figure 1C:
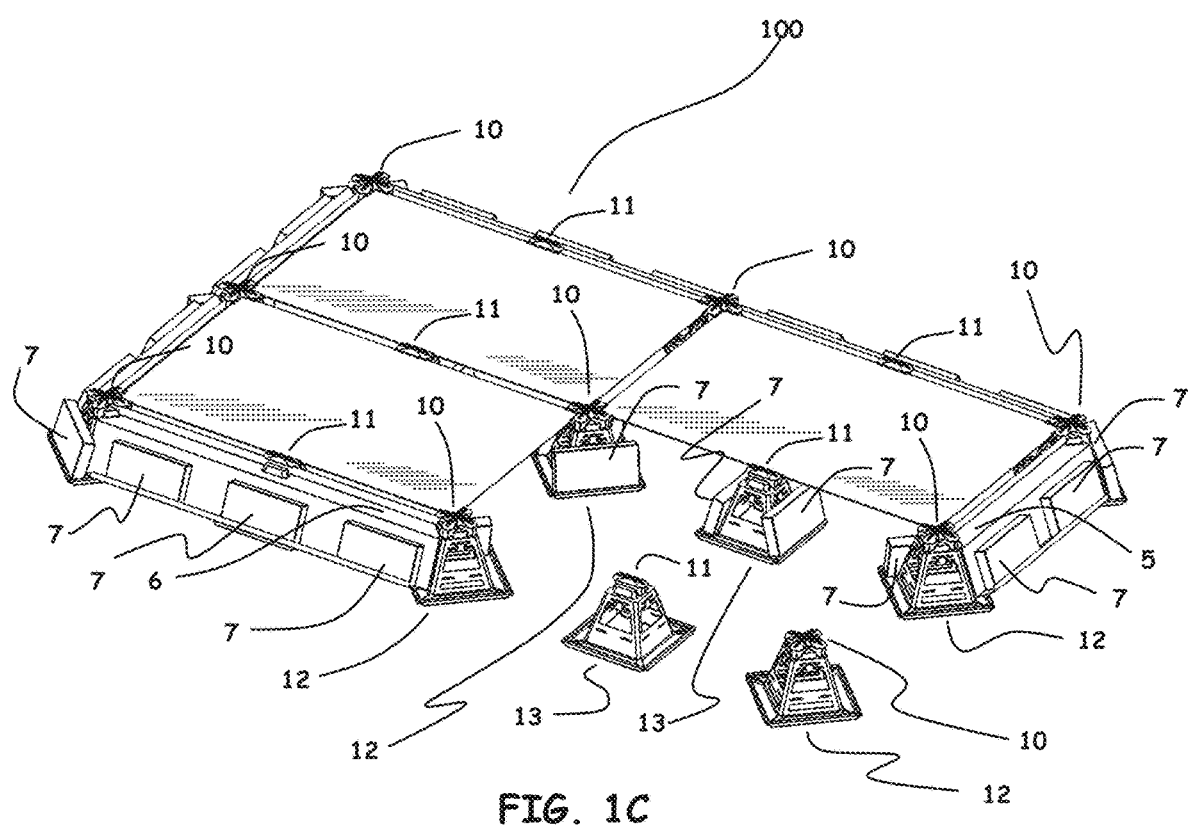
FIG. 1C is a perspective view of the solar array shown in FIG. 1A with wind deflectors, ballast and a photovoltaic laminate removed.

Referring initially to FIGS. 1A, 1B, and 1C, a PV array 100 of one embodiment includes modules 1 mounted on supports on a surface of a structure. The structure may be, for example, a building having a fat roof or any other structure suitable for mounting solar modules. In other embodiments, the PV array may be installed on any surface. For example, in some embodiments, the PV array may be installed on the ground.

In this embodiment, the PV array is a 2×2 array. In other words, the PV array includes four modules 1 arranged in two rows and two columns. In other embodiments, the PV array may include any number of PV modules in any arrangement.

The module 1 includes a laminate 2 and support structures or clips 3, 4 supporting the laminate. In some embodiments, the clips 3, 4 attach the module 1 to pylons 12, 13 and/or to the surface of a structure.

The laminate 2 includes a top surface, a bottom surface, and edges extending between the top surface and the bottom surface. The laminate 2 has a width and a length. In this embodiment, the laminate 2 is rectangular shaped. In other embodiments, the laminate 2 may have any suitable shape.

The laminate 2 also has a laminate structure that may include several layers. The layers may include, for example, glass layers, non-reflective layers, electrical connection layers, n-type silicon layers, p-type silicon layers, and/or backing layers. One or more layers may also include solar cells (not shown). In other embodiments, the solar laminate may have more or fewer, including one, layers, may have different layers, and/or may have different types of layers. In other embodiments, the laminate may be any structure that generates electricity from solar rays.

In one embodiment, for example, the laminate 2 includes photovoltaic material such as solar cells, and electrical interconnect conductors. The solar cells and electrical interconnect conductors may be positioned between materials including glass sheets, adhesives such as ethylene-vinyl acetate, and protectant films such as polyvinyl fluoride film. The laminate may also include external electrical terminals, wiring pigtails, and connectors to enable the module to be electrically connected to other modules and to power conversion devices. The laminate may also include electrical power conversion devices, such as micro-inverters or DC power maximizers, which may be attached to or embedded in the laminate.

FIGS. 1A-C show the modules 1 are supported above the surface at 6 points along the edges of the modules 1 by pylons or supports 12, 13, and then locked in position by keys 10, 11. In this embodiment, the pylons 12, 13, keys 10, 11, and clips 3, 4 are made of molded plastic. In other embodiments, the pylons 12, 13, keys 10, 11, and clips 3, 4 may be made of any materials that enable the pylons 12, 13, keys 10, 11, and clips 3, 4 to function as described. In some embodiments, the pylons 12, 13, keys 10, 11, and clips 3, 4 may be made of different materials.

Figure 5A:
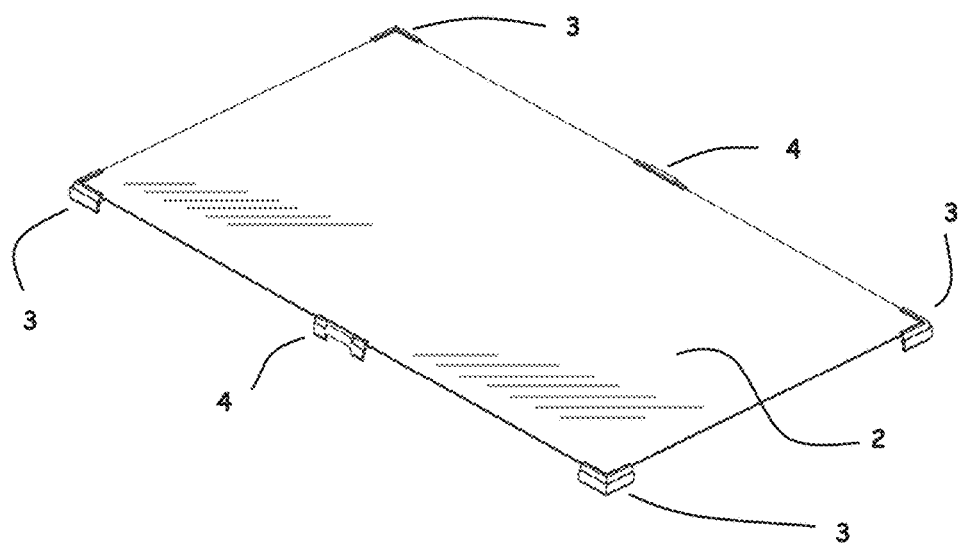
FIG. 5A is a perspective view of a solar module of the solar array shown in FIG. 1A.

As shown in FIG. 5A, the module 1 is frameless. In other words, the edges of the module 1 are free of fully enclosing structures and have only discrete mounting structures attached to the laminate. Being frameless has multiple advantages such as: i) reducing the weight and cost of the module 1; ii) increasing unobstructed surface area available for solar collection; iii) allowing water, snow, and other contaminants to be more easily shed from the module surface without a frame to obstruct flow at the edges. As a result, the frameless module 1 has increased energy generation in comparison to at least some solar modules including fully enclosing frames. In alternative embodiments, the module 1 may include any frame components that enable the solar module to function as described.

Referring back to FIG. 1B, the pylons 12, 13 support the modules 1 and resist forces acting on the modules 1. For example, the pylons counteract downward forces from wind and snow and the gravitational forces on the modules 1. In addition, the pylons 12, 13 and the keys 10, 11 resist environmental upward forces acting on the modules, such upward forces from wind. The multi-point support of the corner pylons or supports 12 and side pylons or supports 13 decreases the overall amount of support material required for the modules 1 and allow the modules 1 to be frameless. In this embodiment, the pylons 12, 13 support the modules 1 at six points to create a 6-point loading dynamic. While the embodiment shown illustrated includes 6 point support of the modules 1, it is also possible to have a 4 point support. For example, the side pylons 13 may be omitted in some embodiments. The 4 point support configuration would reduce the support material when the structural loading on the modules 1 is reduced, or the module assembles 1 are internally reinforced for the larger unsupported span. One method of achieving this internal reinforcement for the module assembly would be through the use of a glass-on-glass laminate. In other embodiments, the modules 1 may be supported in any manner that enables the modules 1 to operate as described.

In addition, in this embodiment, the support systems, including the pylons 12, 13 and keys 10, 11, can be made from electrically insulating material, such as a polymer, and any electrically conductive components of the array can be isolated. Accordingly, there is no need for module-to-module electrical bonding within the array as might otherwise be required by electrical codes when conductive metal frames and support systems are employed. Also, the array is not required to be grounded, and the electrically insulating materials reduce potential induced degradation which can affect the lifetime and performance of PV modules.

The perimeter of the array can be fitted with optional wind deflectors 5, 6. In some embodiments, ballast 7 can be installed on the wind deflectors 5, 6. In addition, the ballast 7 can be installed on the pylons 12, 13 throughout the array as shown in FIG. 1C. The pylons 12, 13, and the wind deflectors 5, 6 allow the ballast 7 to be distributed throughout the array and positioned in positions where additional ballast may be required.

Figure 2A:
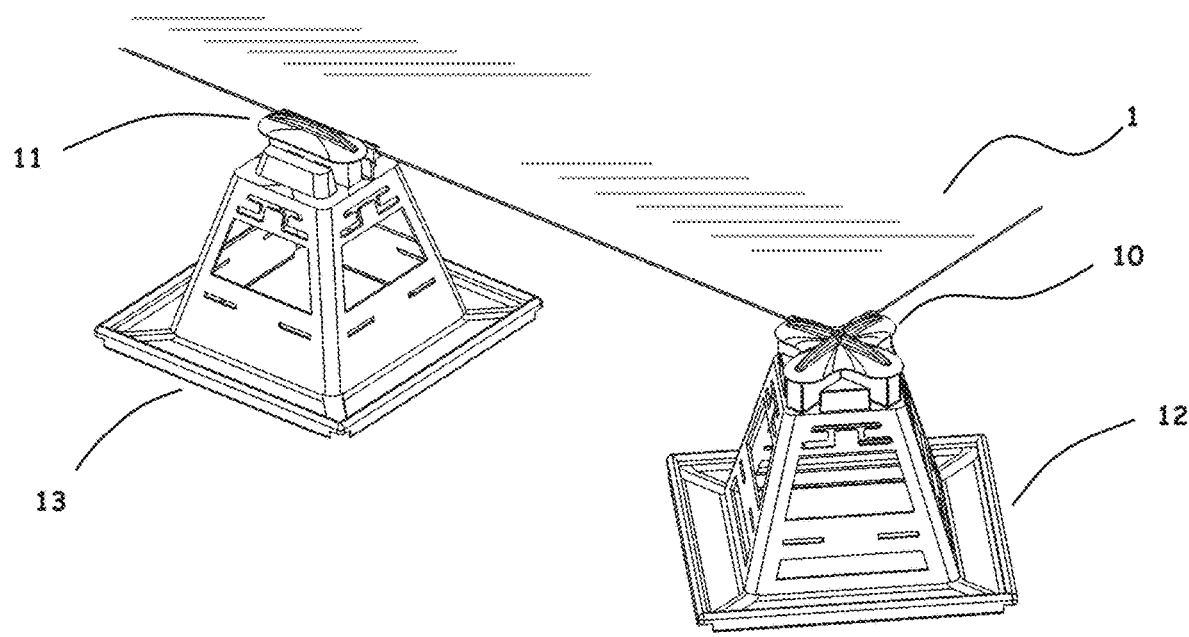
FIG. 2A is an enlarged perspective view of pylons of the solar array shown in FIG. 1A.
Figure 2B:
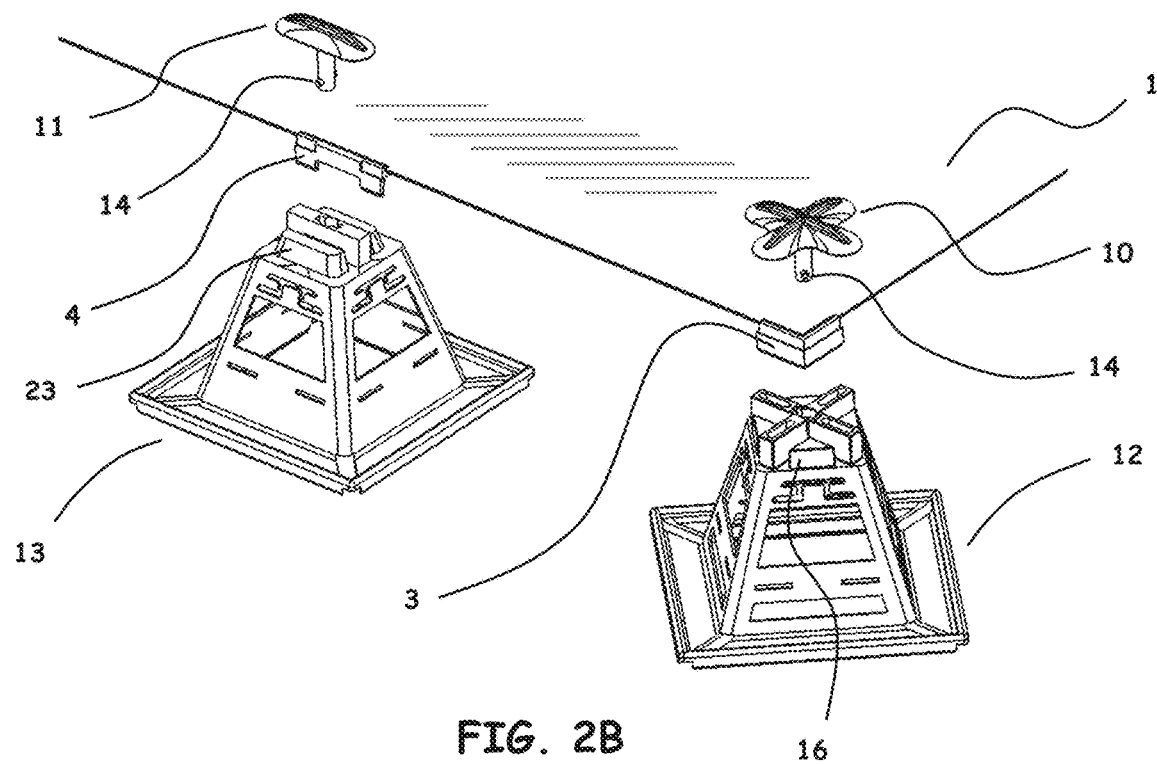
FIG. 2B is an exploded view of the components shown in FIG. 2A.

In reference to FIGS. 2A and 2B, a corner pylon assembly includes the corner pylon 12, the corner clip 3, and the corner key 10. The side pylon assembly includes the side pylon 13, the side clip 4, and the side key 11. Both the corner key 10 and the side key 11 include a lock pin 14 which engages with the bottom side of the top of the pylons 12, 13 to lock the keys 10, 11 in place.

Figures 3A, 3B, 3C:
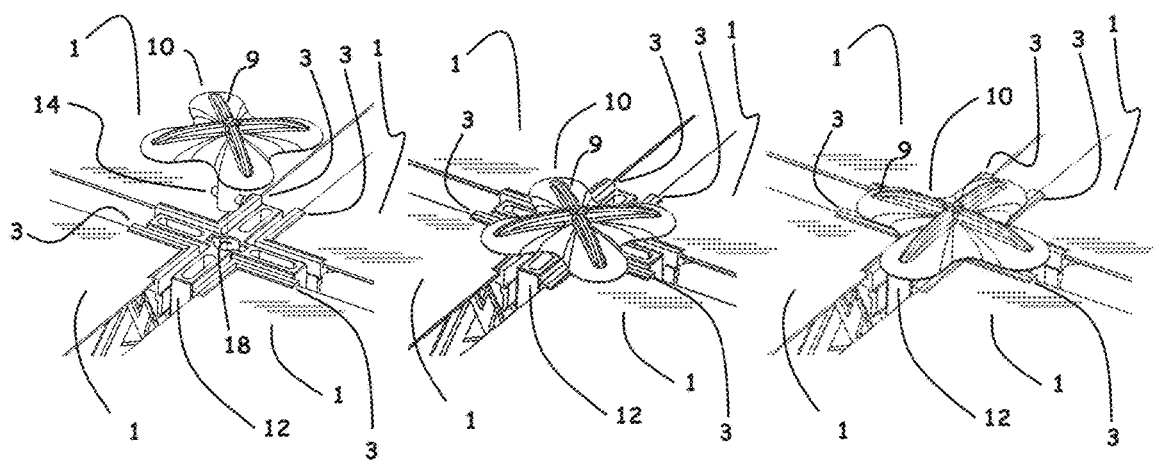
FIG. 3A is an exploded view of a corner locking assembly of the solar array shown in FIG. 1A.
FIG. 3B is an enlarged perspective view of the corner locking assembly in an unlocked position.
FIG. 3C is an enlarged perspective view of the corner locking assembly in a locked position.

As shown in FIGS. 3A-C & 18A-C, the corner key 10 is configured to engage the keyway 18. During assembly, the corner key 10 is positioned such that the lock pin 14 aligns with the keyway 18 and the corner key is inserted into the keyway. The lock pin 14 forces the corner key 10 to align such that a visible top 9 of the key 10 extends over the corner of the module 1, as shown in FIG. 3B, when the corner key is positioned in the keyway. The visible top 9 extending over the module 1 indicates to the installer that the key 10 is not in the locked position. The corner key 10 may be locked into position by turning the corner key 10 an eighth turn in either direction. In the locked position, the corner key 10 captures the corner clip 3 and secures the module 1 to the corner pylon 12 as shown in FIG. 3C.

Figures 4A, 4B, 4C:
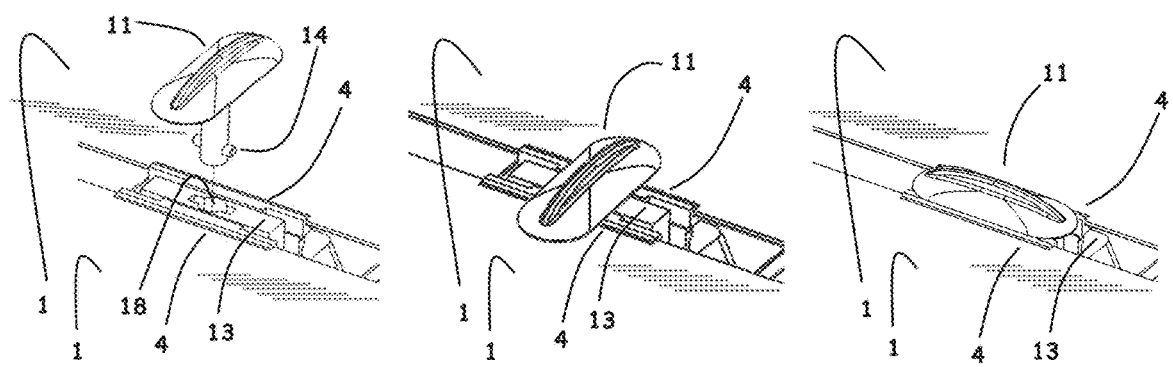
FIG. 4A is an exploded view of a side locking assembly of the solar array shown in FIG. 1A.
FIG. 4B is an enlarged perspective view of the side locking assembly in an unlocked position.
FIG. 4C is an enlarged perspective view of the side locking assembly in a locked position.

As shown in FIGS. 4A-C, the side key 11 is configured to engage the keyway 18. During assembly, the side key 11 is positioned such that the lock pin 14 aligns with the keyway 18 and the side key is inserted into the keyway. The lock pin 14 forces the side key 11 to align such that a visible top of the side key extends over module 1, as shown in FIG. 4B, when the side key 11 is positioned in the keyway 18. The visible top 9 extending over the module 1 indicates to the installer that the key 11 is not in the locked position. The side key 11 may be locked into position by turning the side key 11 a quarter turn in either direction. In the locked position, the side key 11 captures the side clip 4 and secures the module 1 to the side pylon 13 as shown in FIG. 4C.

The keys 10, 11 may be turned without the use of tools, in other words by hand. The hand turned, tool-less locking mechanism reduces the time and equipment required to install the PV modules. The distinctive visual indication of an unlocked, rotated key partially covering the active area of the PV modules, as shown in FIGS. 3B & 4B, increases installation reliability and decreases inspection time.

In alternative embodiments, the keys 10, 11 are secured to the pylons 12, 13 in any manner that enables the array to operate as described. For example, the keys 10, 11 may be secured to the pylons 12, 13 by an interference lock fit along the top of the pylons 12, 13 without insertion of the keys 10, 11 into a shaft.

As shown in FIG. 5A, the module 1 includes the photovoltaic laminate 2, four corner clips 3, and two side clips 4. The number of side clips 4 could be more or less in other embodiments. The number of side clips 4 may be determined at least in part based on factors such as the size and shape of the photovoltaic laminate 2, and the structural loads applied to the laminate 2. In this embodiment, the clips 3, 4 are attached to the photovoltaic laminate 2 with a structural adhesive or tape. In other embodiments, the photovoltaic laminate 2 may be at least partially mounted using mechanical means. The clips 3, 4 may be captured by the pylons 12, 13. In particular, in the illustrated embodiment, the corner clips 3 are positioned in capture features 17 (shown in FIG. 6b) of the corner pylons 12. The side clips 4 are positioned in capture features 21 (shown in FIG. 7a) of the side pylons 13. The capture features 17, 21 limit the lateral motion of the clips 3, 4 relative to the pylons 12, 13. When the keys 10, 11 are in the locked position, the module 1 is fully assembled and the clips 3, 4 are captured in the pylon assembly. When the clips 3, 4 are captured within the pylons 12,13, the capture features 17, 21 provide sufficient clearance between the keys 10, 11 and bearing blocks 16, 23 to allow for lateral translation of the clips 3, 4 relative to the pylons 12, 13. The lateral movement of the clips 3, 4 can reduce wearing due to shifting of support structures on the surface. For example, the clips 3, 4 may inhibit the pylons 12, 13 rubbing on roofing material.

Figure 5B:
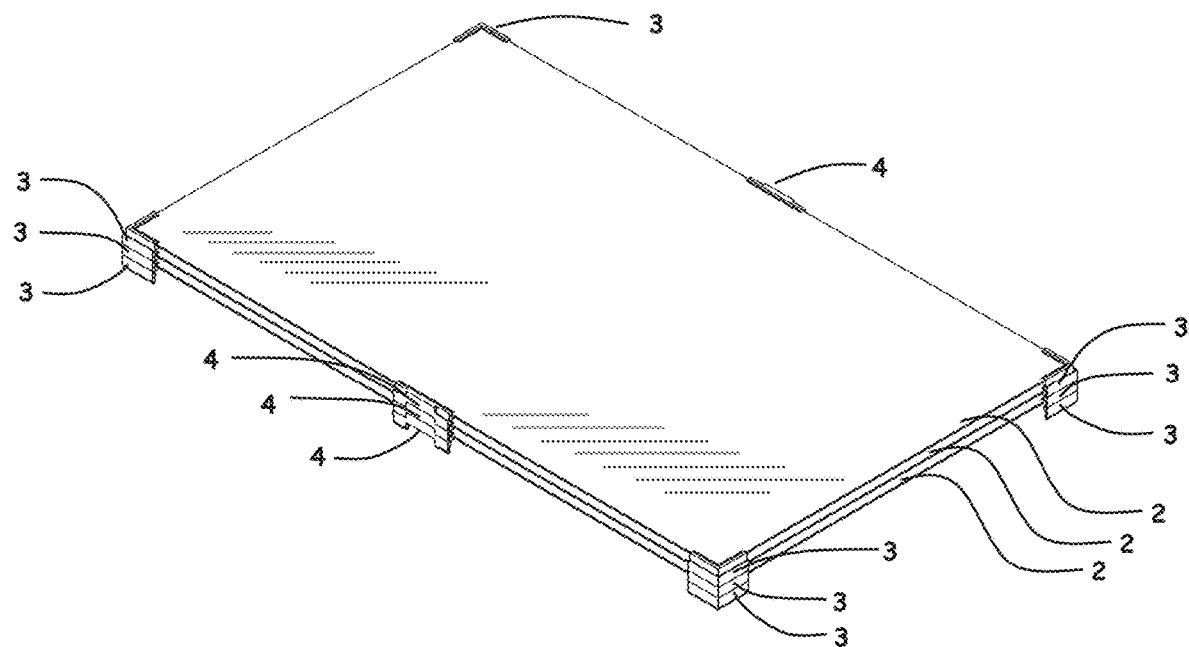
FIG. 5B is a perspective view of stacked solar modules.
Figure 10C:
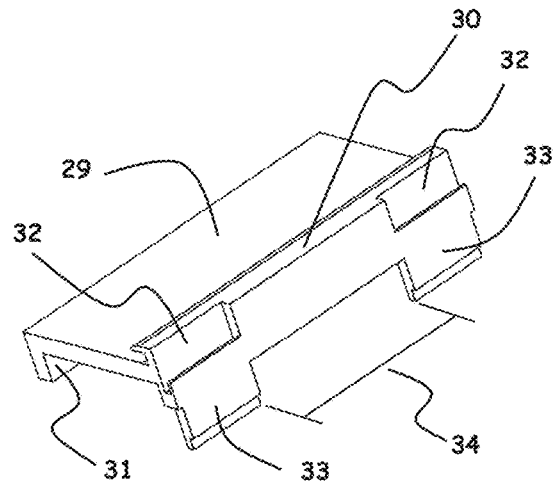
FIG. 10C is an enlarged perspective view of the side clips of stacked modules.
Figure 10C:
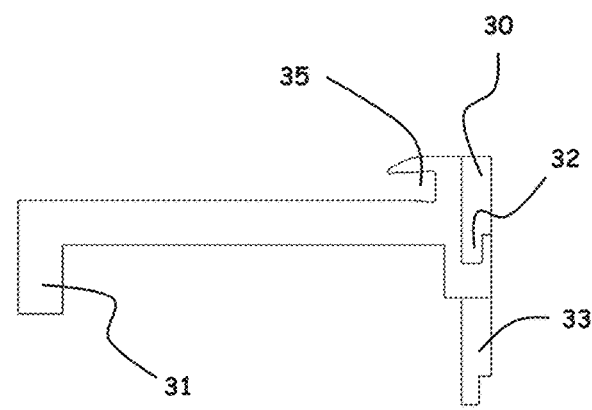
Figure 10C:
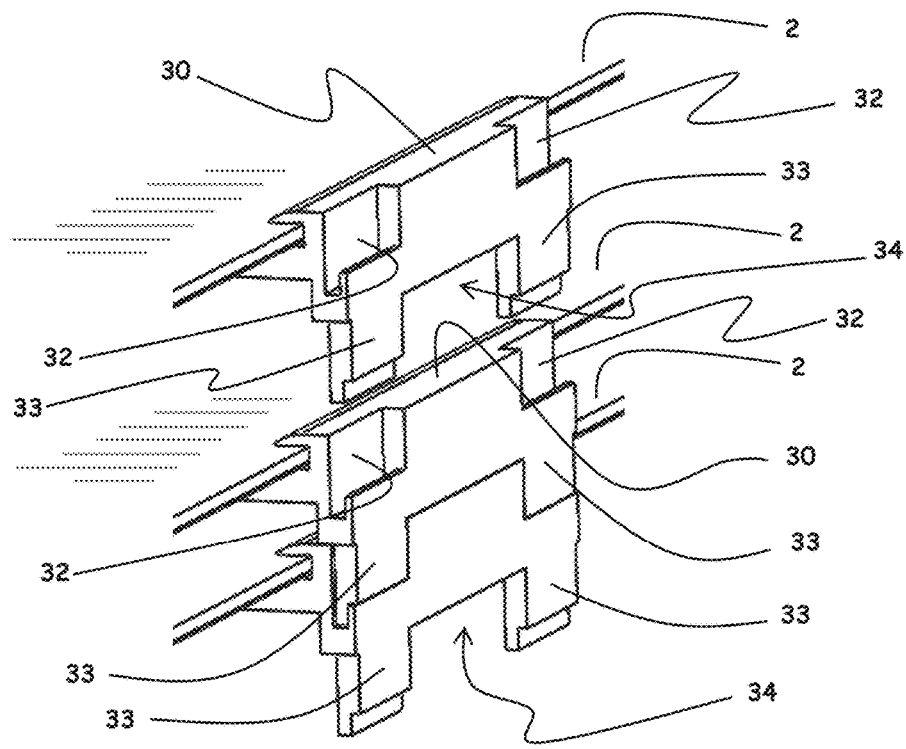

The clips 3, 4 are also configured to facilitate stacking the modules 1. For example, FIG. 5B shows three modules 1 stacked on top of each other. The clips 3, 4 lock into each other as shown in FIG. 9C and FIG. 10C and make the stacked modules 1 resistant to separation from lateral loads, for example during shipment. The clips 3, 4 are an integral hardware component of the module 1. For example, the clips 3, 4 allow stacking of the modules 1 during shipping and installation. In addition, the clips 3, 4 support and stabilize the module 1 during operation. The stacked modules 1 provide high shipping density and small footprint when removed from the surface. Accordingly, the clips 3, 4 reduce the use of disposable packaging and shipping components and reduce the materials and time required for shipping, installation, and movement of the modules 1. In addition, the clips 3, 4 serve multiple functions and reduce cost, waste and part count.

Figure 6A:
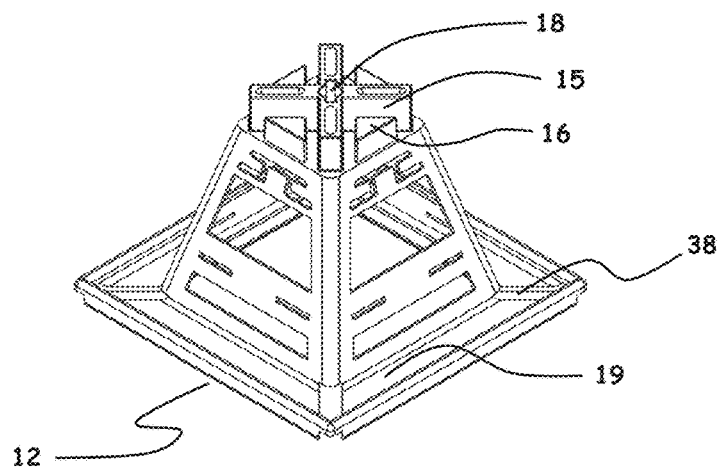
FIG. 6A is a perspective view of a corner pylon.
Figure 18A:
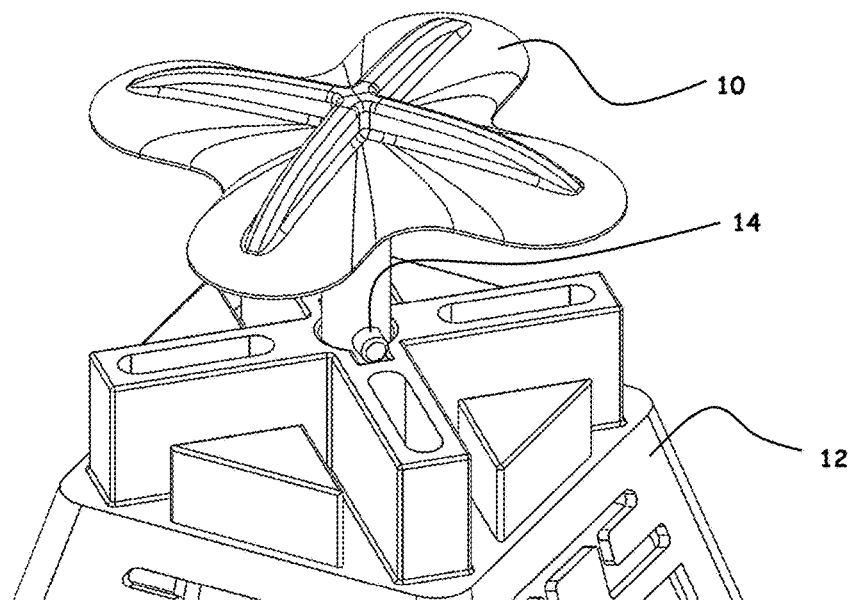
FIG. 18A is an enlarged perspective view of the corner pylon with the key aligned to the keyway ready for insertion.
Figure 18B:
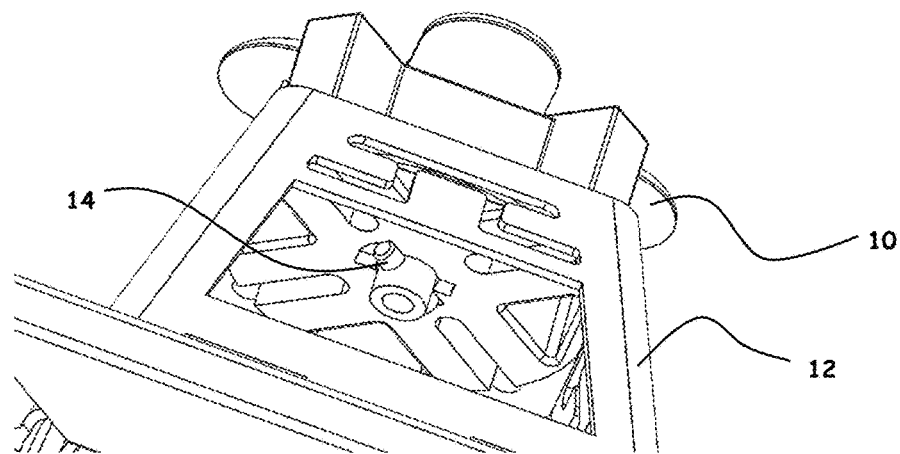
FIG. 18B is a perspective view of the bottom portion of the corner pylon of FIG. 18A with key inserted in the keyway in an unlocked position.
Figure 18C:
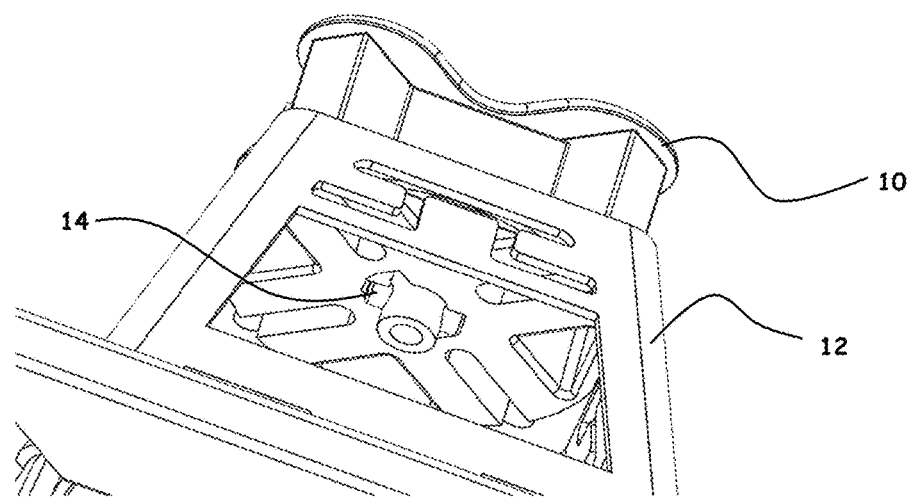
FIG. 18C is a perspective view of the bottom portion of the corner pylon of FIG. 18A with key inserted in the keyway in a locked position.
Figure 19A:
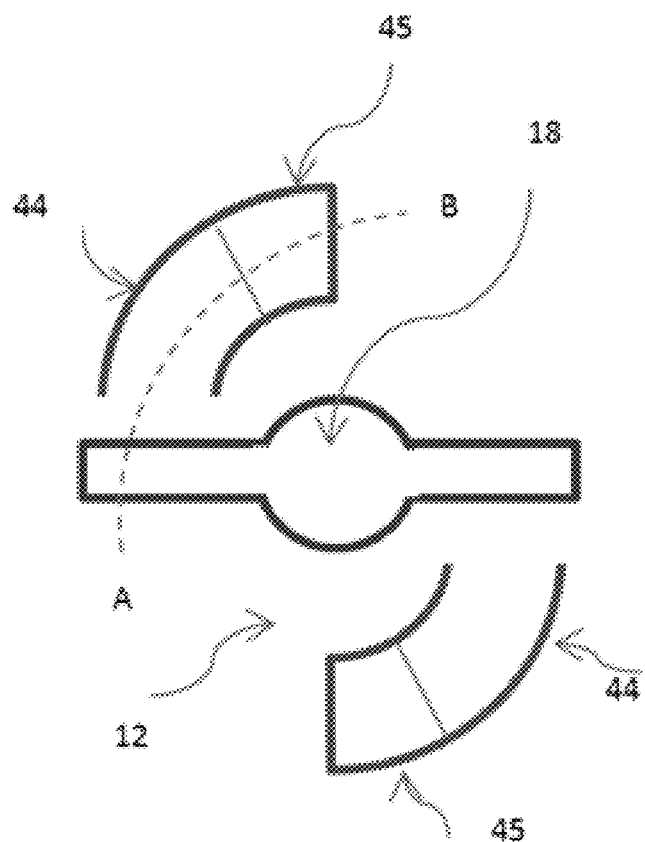
FIG. 19A is a schematic bottom view of a lower portion of the pylon including a keyway and locking grooves.
Figure 19B:
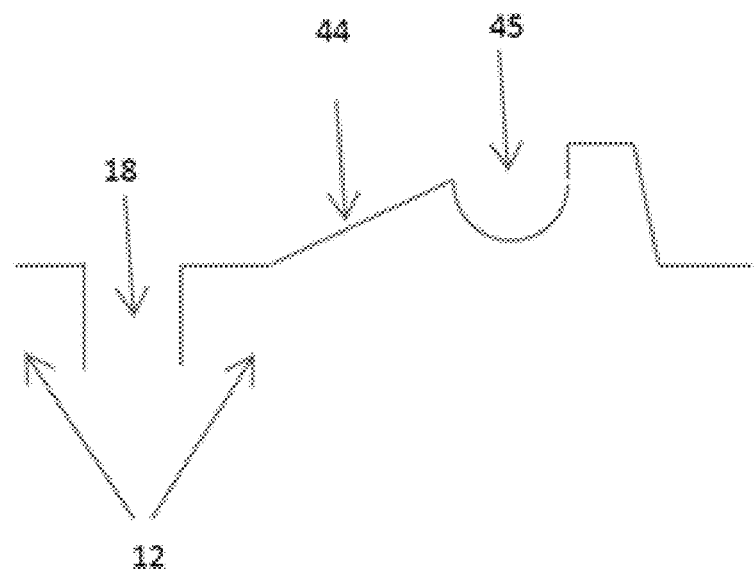
FIG. 19B is a section view of the portion of the pylon shown in FIG. 19A.

FIG. 6A shows a perspective view of the corner pylon 12. The keyway 18 is located along the center of the pylon 12 and extends through the top of the pylon 12 towards the base. The keyway 18 at least partially receives the corner key 10 and allows the lock pin 14 and shaft of the corner key 10 to pass through the keyway 18 to the bottom side of the top of the pylon 12 where a locking mechanism is located, as shown in FIGS. 18A-C. In some embodiments, the locking mechanism as shown in FIGS. 19A-B includes two symmetrical circular locking ramps 44 molded into the pylon 12 for the pins 14 to ride across as the key 10 is rotated. The ramps 44 cause the clamping force between the key 10 and the pylon 12 to increase as the key 10 is rotated toward the locked position, which causes an increase in the force required to rotate the key 10. When the key 10 is rotated into the locked position, the pins 14 settle into the lock groove 45, thus relieving a portion or all of the clamp force on the pins 14. The advantage to this design is that a clamp force is not required to keep the key 10 in the locked position, since unlocking the key 10 requires an abrupt transition of the pins 14 to the highest point at the end of the lock ramp 44 with a correspondingly high breakout rotational force. The gradients of the locking ramp 44, the length of the key 10, and the depth and shape of the lock groove 45 can be adapted to provide i) low-force locking of the key, ii) suitable as-locked tension on the key, or elimination of key tension when locked, and iii) manageable unlocking forces which prevent inadvertent unlocking of the array. Moreover, as shown in FIG. 3C, the visible top 9 of the key 10 is aligned with the module sides when the key 10 is in the locked position due to the rotational angle of the lock pins 14 relative to the visible top 9 of the key 10 and the rotational angle of the lock groove 45 relative to the keyways 18.

Furthermore, in one embodiment the height of the channel in the pylon 12 allows the module 1 to be spaced from at least one of the key 10 and the pylon 12 when the module 1 is secured between the key 10 and the pylon 12. In particular, the locking of the key 10 to the pylon 12 creates a cavity between the pylon 12 and the key 10 in which the clips 3 of the module 1 are free to slide. Moreover, the key 10 is locked in position by a compression force between the key 10 and the pylon 12 and the compression force does not act on the module 1.

Figure 6B:
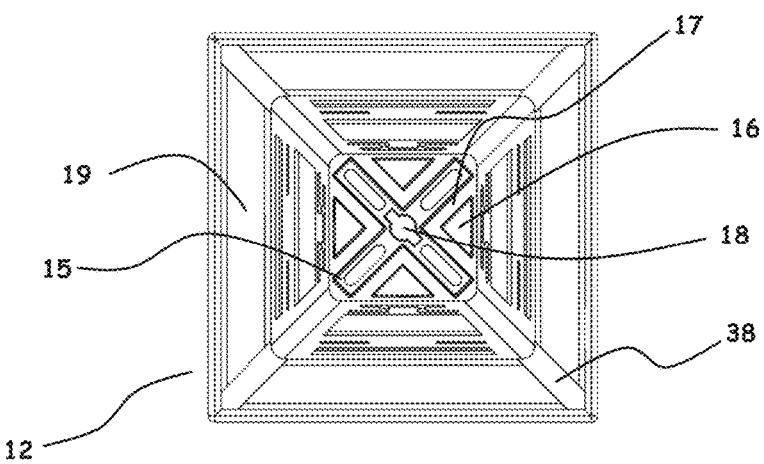
FIG. 6B is a top view of the corner pylon.
Figure 7A:
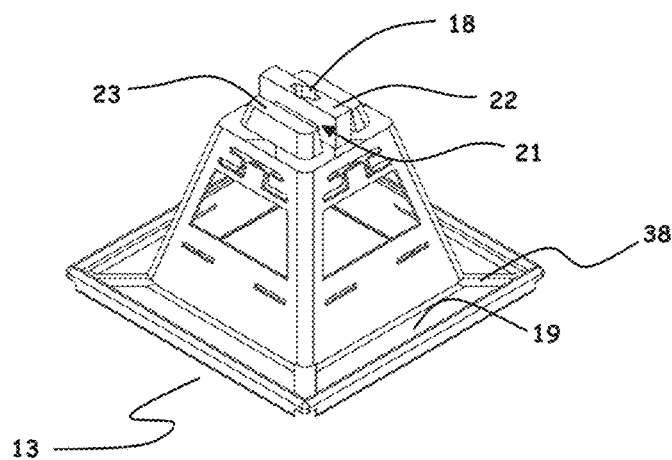
FIG. 7A is a perspective view of a side pylon.
Figure 8A:
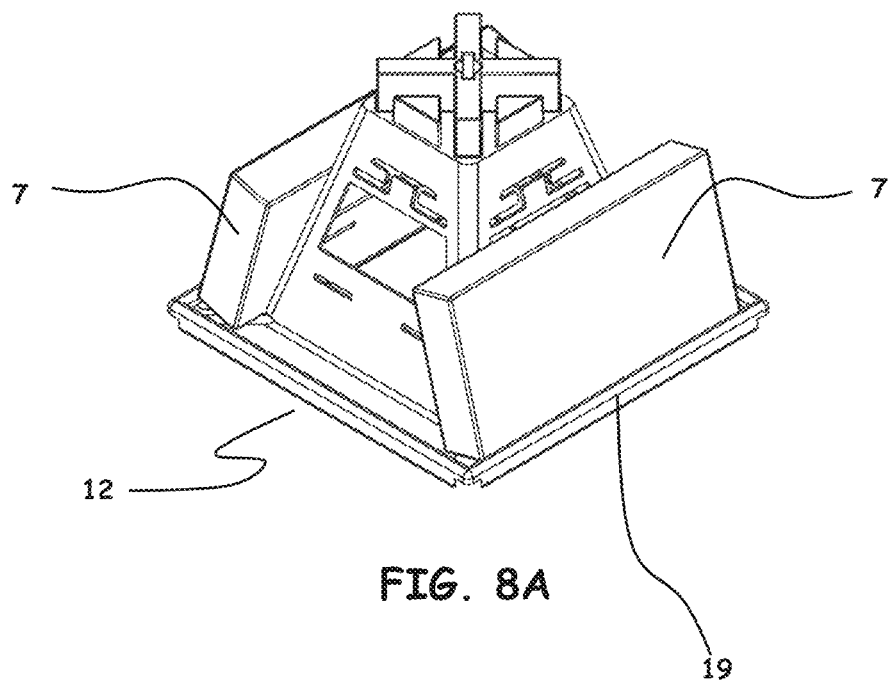
FIG. 8A is a perspective view of the corner pylon with 2 ballast blocks.

The dimensions of the pylons 12, keys 10, pins 14, locking ramps 44, and locking grooves 45 are designed to provide the necessary low locking force, low to zero locked force, and higher unlocking forces consistent with normal structural design criteria, material properties and manufacturing tolerances. In addition, this design is resistant to malfunction due to creep which sometimes occurs in polymeric material under load. Moreover, the key 10 may hold the module 1 to the pylon 12 even when stress is removed from the key The corner clip 3 of the module 1 is captured by the back stop 15 and the bearing block 16 as shown in FIG. 6B. The clip 3 can move laterally within the slip channel 17 formed by the back stop 15 and the bearing block 16. The bearing block 16 translates the downward forces from the module 1 to the pylon 12. The back stop 15 controls the minimum gap between adjacent modules 1 allowing for pressure equalization above and below the array during wind events. The pylon 12 includes a ballast channel 19 where ballast can be placed and leaned against the side of the pylon 12 as shown in FIG. 8A. As shown in FIG. 7A, the pylon 12 may also include drainage slots or drains 38 that allow water on the roof surface to flow through the pylon 12 and minimize ponding of water on the roof. In this embodiment, the pylon includes 4 drainage slots 38.

Figure 6C:
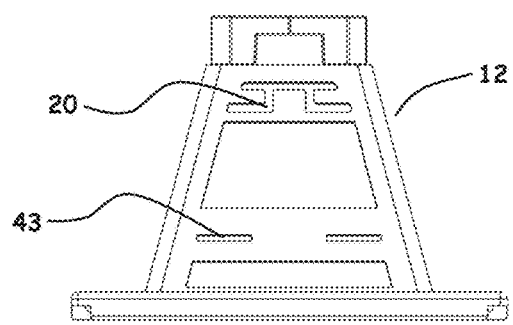
FIG. 6C is a side view of the corner pylon.
Figure 13A:
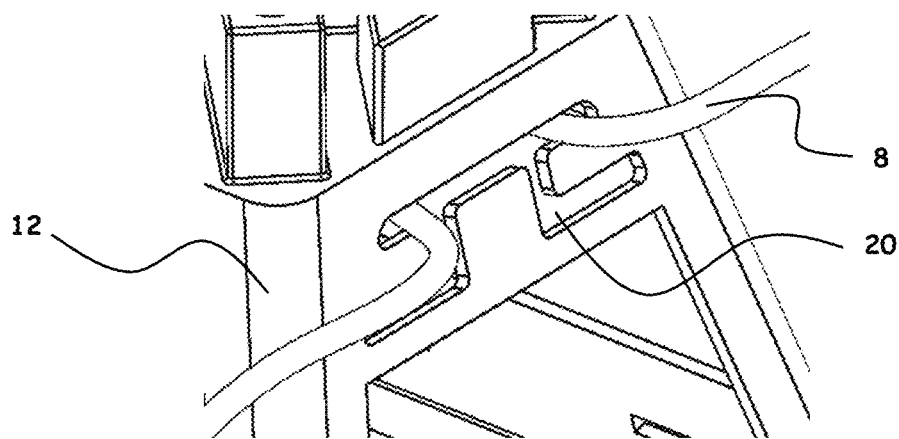
FIG. 13A is an enlarged perspective view of a photovoltaic wire positioned in a wire receiver of a pylon.
Figure 13B:
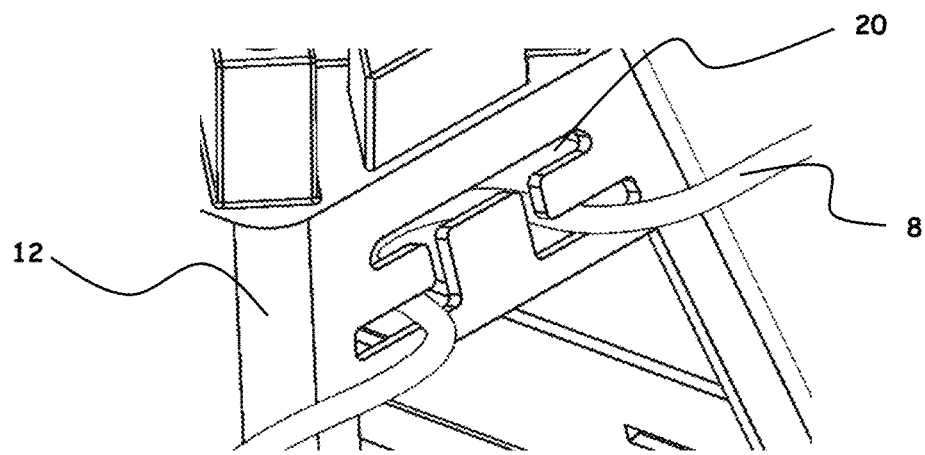
FIG. 13B is an enlarged perspective view of the photovoltaic wire secured in the wire receiver
Figure 13C:
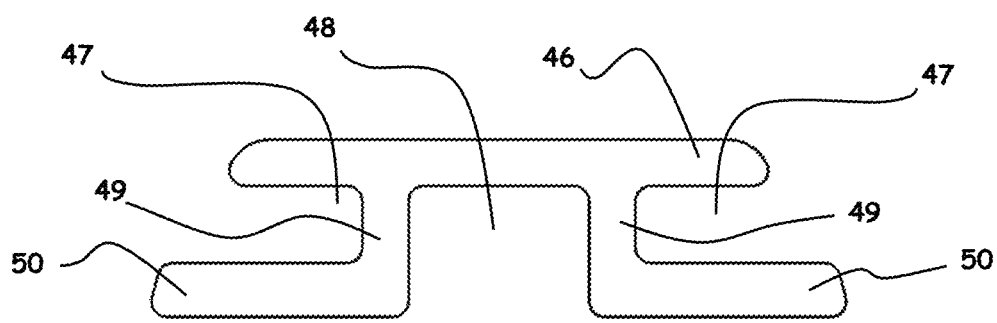
FIG. 13C is an enlarged schematic view of the wire receiver.

Wire receivers 20 are located on the sides of the pylon 12 as shown in FIG. 6C and are used to secure the photovoltaic electrical wires 8 (shown in FIGS. 13B and 13C) above the roof. In the illustrated embodiment, the wire receivers 20 are planar with the sides of the pylon 12. Details of how the wires 8 are inserted and held in the wire receivers 20 are shown in FIGS. 13A and 13B. In some embodiments, the wire receivers 20 include slots 46, 49, 50 separated by fingers 47 and at least one catch or cleat 48. In this embodiment, the slots include a wire insert slot 46, wire transition slots 49, and a wire capture slot 50. The wire insert slot 46 and the wire capture slot 50 extend horizontally, i.e., parallel to the mounting surface. In this embodiment, the wire insert slot 46 is above the wire capture slot 50. The wire transition slots 49 extend vertically and connect the wire insert slot 46 and the wire capture slot 50. The cleat 48 extends across the capture slot 50, between the fingers 47, and generally divides the capture slot 50 into two portions.

During assembly, the wire is inserted in the wire insert slot 46 and moved through the wire transition slots 49 into the wire capture slot 50. Fingers 47 (FIG. 13C) extend horizontally along the wire insert slot 46 and the wire capture slot 50. The two fingers 47 guide the wire and secure the wire in the wire capture slot 50. In this embodiment, the fingers 47 and the cleat 48 are substantially planar and in the same plane generally as the side of the pylon 12. In other embodiments, the wire receivers 20 may include any fingers 47 and/or cleat 48 that enable the wire receiver 20 to function as described. For example, in some embodiments, at least one of the fingers 47 and the cleat 48 may extend at an angle.

Also during assembly, the wire 8 is inserted in the slots 46, 49, 50 and positioned at least partially around the cleat 48 such that the cleat resists movement of the wire and suspends the wire about the support surface. For example, a friction force is produced between the cleat 48 and the wire 8 to resist movement of the wire. In some embodiments, the wire receivers 20 are integrally formed on the pylon 12 such that the pylons 12 can be stacked. For example, in some embodiments, the pylon 12 is formed from plastic, such as polymer, in a mold and the wire receiver 20 is formed by the mold. In other embodiments, the pylon 12 includes any wire receivers 20 that enable the pylon 12 to function as described.

The wire receiver 20 may secure any wires 8 to the pylon 12. For example, in this embodiment, each wire receiver 20 holds up to three wires 8. However, the wire receiver 20 is scaleable and may hold any number of the wires 8.

Figure 14A:
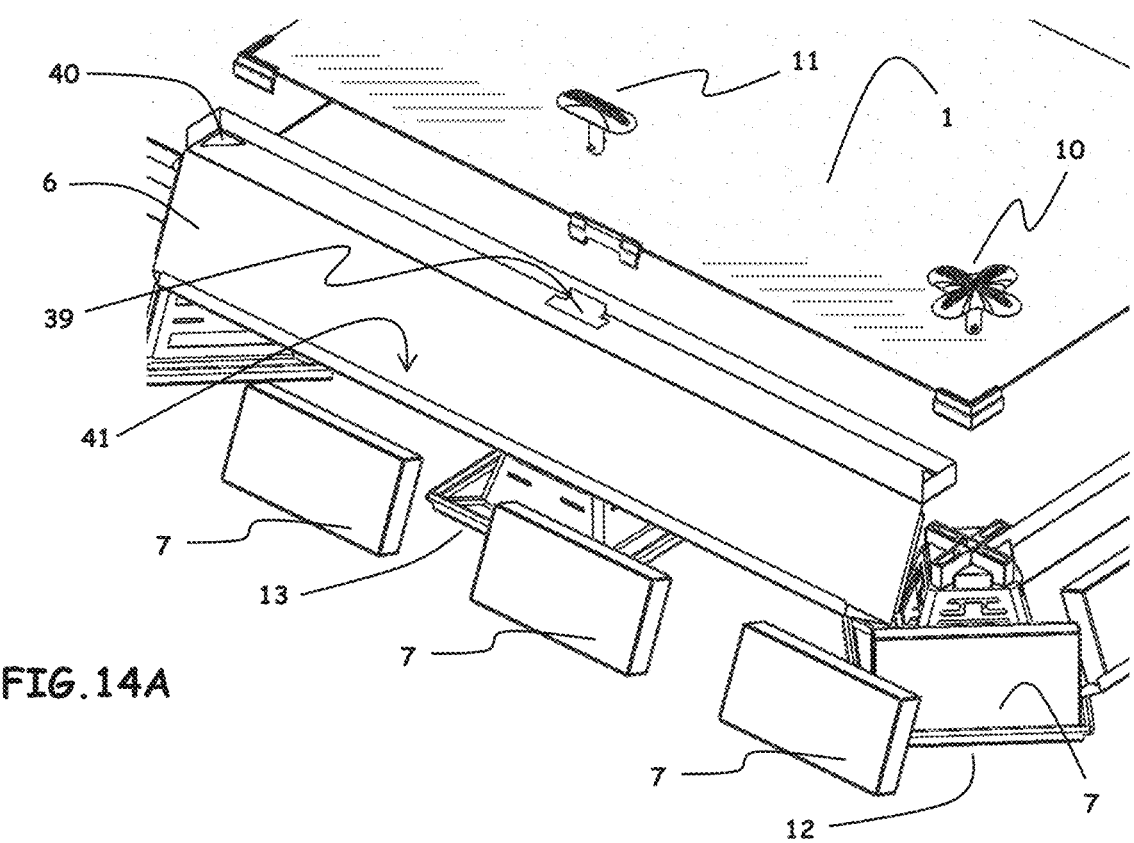
FIG. 14A is an exploded perspective view of a wind deflector.
Figure 14B:
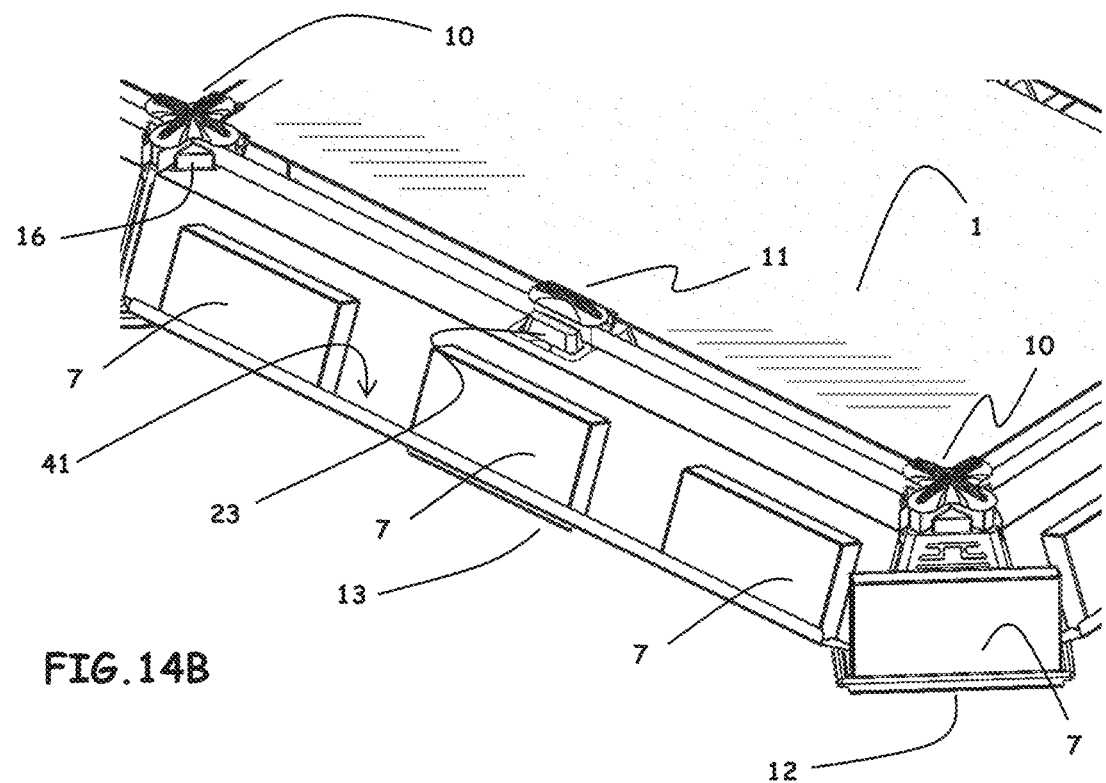
FIG. 14B is an enlarged perspective view of the wind deflector.
Figure 15:
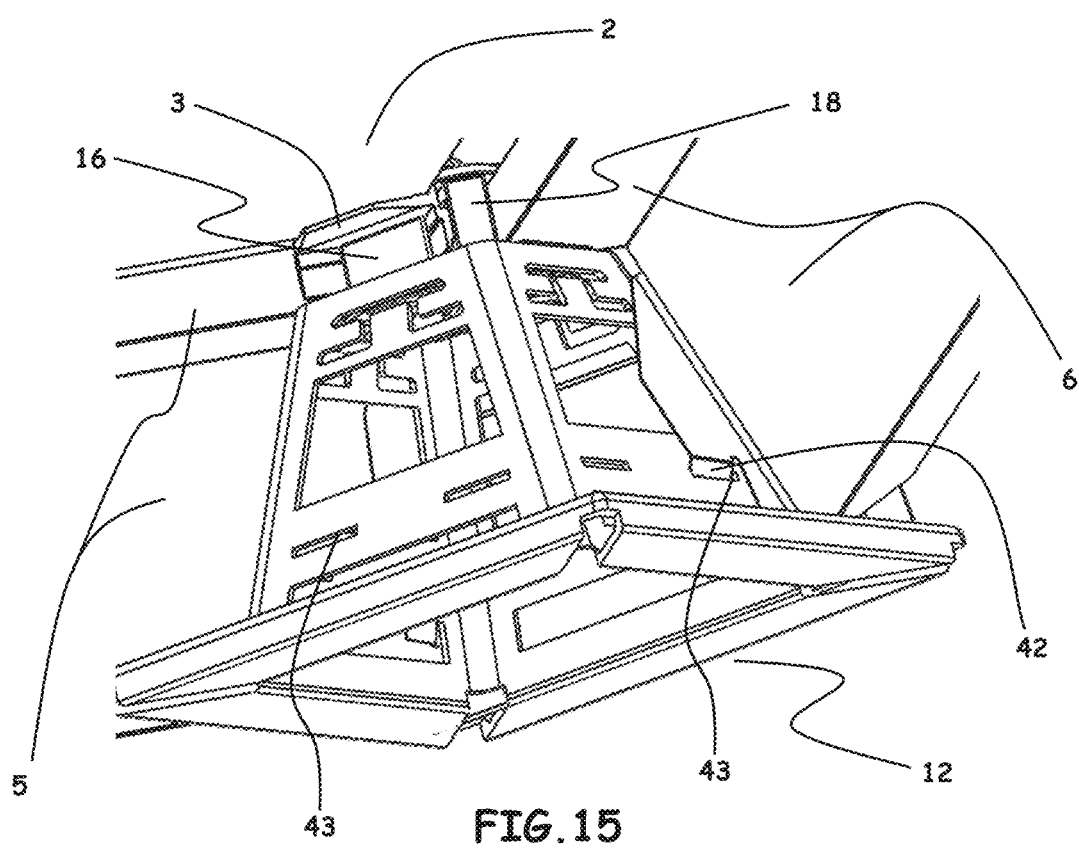
FIG. 15 is a bottom perspective view of the wind deflector connected to a pylon.

As shown in FIGS. 14A, 14B, and 15, the wind deflector slots 43 may be used to capture the lock tab 42 of the wind deflectors 5, 6. The wind deflectors 5, 6 may be secured in the wind deflector slots 43 when the modules 1 are connected to the pylons 12, 13 by the corner key 10. The wind deflectors 5, 6 are secured to the pylons 12, 13 by the keys 10 such that the wind deflectors 5, 6 are allowed to move relative to the mounting surface similar to the modules 1. As a result, movement of the entire array 100, including the modules 1 and components such as the wind deflectors 5, 6 is decoupled from movement of the mounting surface.

Figure 7B:
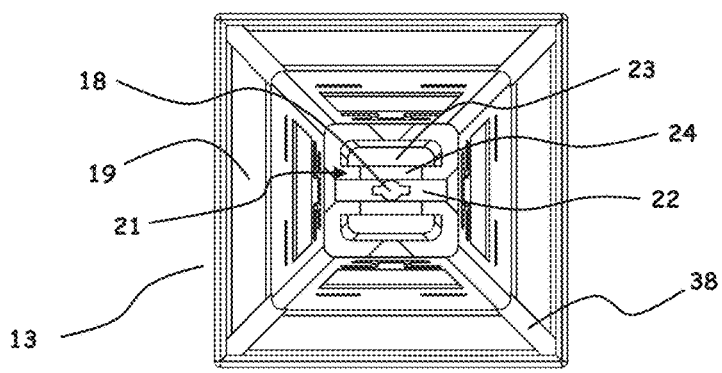
FIG. 7B is a top view of the side pylon.
Figure 7C:
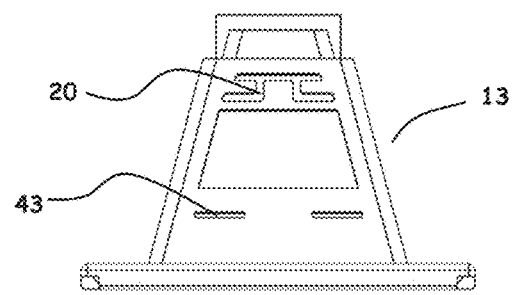
FIG. 7C is a side view of the side pylon.

FIGS. 7A-C show the side pylon 13. The keyway 18 is located along the center of the pylon 13 and extends through the top of the part towards the base. The keyway 18 at least partially receives the side key 11 and allows the lock pin 14 and shaft of the side key 11 to pass through the keyway 18 to the bottom side of the top of the pylon 13 where the locking ramps 44 and locking grooves 45 are located. The side key 11 locks in place in the locking groove in the same manner as the corner key 10 as illustrated in FIGS. 19A and 19B.

The side clip 4 of the module 1 is captured by the back stop 22, the bearing block 23 and the saddle 24. The clip 4 can move laterally within the slip channel 21 formed by the back stop 22, the bearing block 23 and the saddle 24. The bearing block 23 transmits downward forces from the module 1 to the pylon 13. The back stop 22 controls the minimum gap between adjacent modules 1 allowing for pressure equalization above and below the array during wind events.

The pylon 13 includes a ballast channel 19 where ballast can be placed and leaned against the side of the pylon 13 as shown in FIG. 8A. Similar to pylon 12, the pylon 13 also includes drainage slots 38 (shown in FIG. 7B) along a base of the pylon, wire receivers 20 (shown in FIG. 7C) located on the sides of the pylon 13, and wind deflector slots 43 (shown in FIG. 7C) to capture the lock tab 42 of the wind deflectors 5, 6.

Figure 8B:
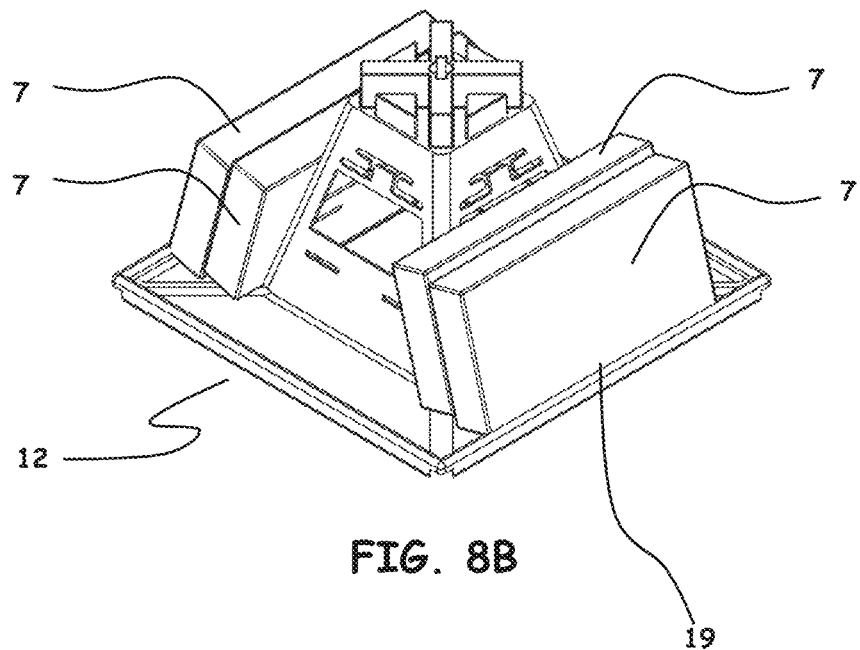
FIG. 8B is a perspective view of a corner pylon with 4 ballast blocks.

By standing the ballast 7 on an edge and against the side of the pylons 12 as shown in FIG. 8A, the overall footprint of the ballast 7 on the roof is reduced. Specifically, the ballast 7 is positioned on the pylon 12 in a direction perpendicular to the surface. For example, in this embodiment, the ballast 7 is substantially vertical. The ballast channel 19 distributes the load around the entire pylon 12 reducing the point load on the structure supporting the array. For example, for a structure such as a roof, distribution of the load may reduce point loading on components such as foam insulation and allow the roof warranty to be maintained. The reduced footprint along with the drainage slots 38 help reduce water ponding on the roof to inhibit roof leaks. In addition, the reduced ponding helps keep the ballast block 7 dry which reduces freeze-thaw stresses that can degrade the concrete of the ballast blocks 7. The placement of the ballast block 7 also simplifies installation. For example, the ballast blocks 7 may installed and/or removed from the pylons 12, 13 with one hand. FIG. 8B shows another embodiment of the pylon 12 with a wider ballast channel 19 that can accept four ballast blocks 7. The ballast 7 may also be installed on the side pylons 13 in a similar manner to reduce point load and ponding.

An embodiment of the corner clip 3 is shown in the perspective view in FIG. 9A and a side view in FIG. 9B. The corner clip 3 fits against the corner of the laminate 2 such that the laminate 2 slips into a laminate acceptance cavity 28 of the clip 3. Both the acceptance cavity 28 and the adhesive platform 27 may have a layer of adhesive to secure the corner clip 3 to the laminate 2.

An embodiment of the side clip 4 is shown in perspective view in FIG. 10A and side view in FIG. 10B. The side clip 4 fits against any side of the laminate 2. The laminate 2 edge slips into a laminate acceptance cavity 35. Adhesive may be applied into the laminate acceptance cavity 35 and on an adhesive pad 29 to physically attach the side clip 4 to the laminate 2. In other embodiments, the clips 3, 4 may be secured to the laminate 2 by adhesive, tape, fasteners, and any other suitable attachment.

The corner clip 3 and the side clip 4 serve multiple functions. For example, the clips 3, 4 facilitate assembly of the modules 1, shipment of the modules 1, and assembly of the modules 1 to form the array. As described below, the clips 3, 4 engage and auto-align during assembly to facilitate attaching the clips 3, 4 to the modules 1 in the correct position. In addition, the clips 3, 4 engage and lock together to facilitate stacking the module 1 in a suitable assembly of modules 1 such as for shipping and handling the modules 1. Moreover, the clips 3, 4 are support structure attached to the laminate 2 and allow the modules 1 to be secured to the pylons 12, 13. The clips 3, 4 are integrated into the modules 1 and eliminate the necessity of using at least some separate components during assembly, shipment, and installation.

Each corner clip 3 is configured to engage corner clips 3 stacked on top of the corner clip 3. Specifically, in this embodiment, each corner clip 3 has a corner clip groove 25 that wraps around the outside of the clip and captures a corner clip tongue 26 of the clip above when the modules 1 are stacked together for shipping as shown in FIG. 9C. Once the clips 3 are fully engaged, the clips 3 lock together resisting lateral motion which simplifies packaging and reduces shipping costs. In other embodiments, the clips 3 may include any engagement features that enable the clips to function as described. In further embodiments, the clips may be locked together using pins and/or fasteners.

Also, each side clip 4 is configured to engage side clips 4 stacked on top of the side clip 4. Specifically, in this embodiment, each side clip 4 has two grooves 32 on either side of a clip saddle 30. A side clip tongue 33 engages with the groove 32 around the saddle 30 of the lower clip when the modules 1 are stacked together for shipping as shown in FIG. 10C. Once the clips 4 are fully engaged the clips 4 lock together resisting lateral motion which simplifies packaging and reduces shipping costs. In other embodiments, the clips 4 may include any engagement features that enable the clips to function as described. In further embodiments, the clips 4 may be locked together using pins and/or fasteners.

As shown in FIG. 10B, each side clip 4 includes a vertical support 31. The vertical support 31 extends in a vertical direction and is spaced from an outer face of the side clip 4. The vertical support 31 contacts an adjacent module 1 when the modules 1 are stacked, and can ensure adhesive contact between the laminate and the adhesive platform until the adhesive is cured. The vertical support 31 provides support, and reduces torsion forces and motion. This is advantageous because torsional forces due to stacking can rotate the adhesive platform away from the laminate so they are no longer parallel and in contact. This means that the adhesive or tape might not otherwise engage and fix the clip to the laminate.

The locking of the clips 3, 4 to each other facilitates aligning the clips 3, 4 to the laminate 2 during assembly. The first set of clips 3, 4 may be positioned on the laminate using a jig or in any other suitable manner. Once the first set of clips 3, 4 are fixed in the correct position on the first module of a new stack, the next and successive sets of clips 3, 4 can be securely aligned with the first set even before the adhesive is cured. Thus, a stack of panels can be assembled rapidly with assured alignment throughout the stack. In some embodiments, the first set of clips 3, 4 may be mounted on a manufacturing jig instead of using the first module as the jig, such that all modules in the stack are aligned to the clips on the jig before the adhesive is cured. Therefore, the clips 3, 4 reduce cost by reducing the need for expensive equipment that would otherwise be needed to hold the position of the side clips 4 with respect to the laminate 2 for the duration of the adhesive curing time for every module.

In another embodiment, a fixture on a pallet may be provided to accept and lock the clips in place for the first module. For example there may be a pallet corner fixture block and a pallet side fixture block. These would be similar to the clips described herein but allow for being attached or fastened to the pallet.

Figure 11A:
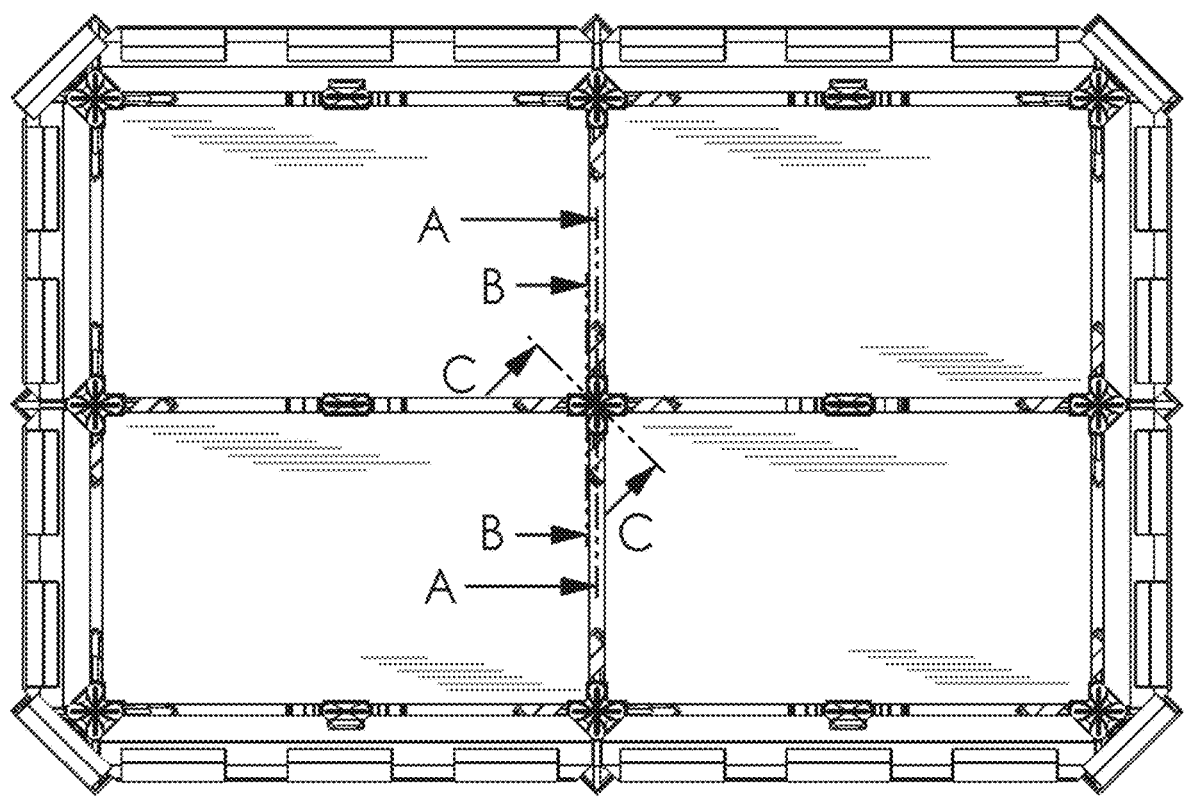
FIG. 11A is a top view of the array shown in FIG. 1A.

A top view of the array is shown in FIG. 11A with section lines showing the cross sectional views depicted in the following figures. FIG. 11B shows the cross sectional view of the array along section line A-A. Section line A-A extends through the center of the pylon 13 and along the center of the back stop 15 and the keyway 18 with the ballast blocks 7 removed. FIG. 11B shows how the shaft of the key 10 fits in the keyway 18. FIG. 11C shows the cross sectional view of the array along section line B-B. Section line B-B extends through the bearing blocks 16 and the corner keys and the corner pylon 12. FIG. 11C shows how a bottom of the adhesive platform 27 rests on a top of the bearing block 16. In addition, FIG. 11C shows the location of the locking pin 14 on the shaft of the corner key 10 just under the bottom side of the top section of the pylon 13. FIG. 11D shows the cross sectional view of the array along section line C-C. Section line C-C extends through the center of the pylon 12 and is parallel with the sides of the pylon's 12 ballast channels 19.

As shown in FIG. 13A, a wire receiver 20 is formed along the sides of the pylons 12, 13 and acts as an integrated wire management device. During installation, an unbroken wire 8 is bent and then slid into the insert slot 46 as shown in FIG. 13A. Then the wire 8 is pushed down through the transition slots 49 and fixed in the capture slot 50 as shown in FIG. 13B. Accordingly, the wire 8 is captured in the wire receiver 20. Several wires 8 can be placed in one wire receiver 20. The wire receiver 20 reduces the need for independent wire clips or zip ties and decreases time and cost to install the modules 1.

FIG. 14A is an exploded view of the wind deflector 6 assembly, and FIG. 14B is an assembled view of the wind deflector 6 assembly. The wind deflectors 5, 6 have bearing block notches 40 that fit around the bearing blocks 16 of the corner pylon. This captures the deflector 5, 6 in the same manner the corner clip 3 of the module 1 is captured. The deflector 5, 6 is captured in the slip channel 17 by the bearing block 16 and the back stop 15 of the corner pylon 12. The captured deflector 5, 6 has freedom of movement in at least two directions parallel to the roof plane. The wind deflector 6 is also captured in the side pylon slip channel 21 by the bearing block 23 and the back stop 22 of the side pylon 13 and through the saddle notch 39 in the wind deflector 6. This mechanism also allows for freedom of movement in at least two directions parallel to the roof plane. Once the keys 10, 11 are installed, the top of the wind deflector 6 is locked into the array.

While the wind deflector 6 illustrated in FIGS. 14A and 14B is configured for use on a relatively long side of the module 1, the deflector 5 for the short side of the module 1 is installed in a similar manner. The wind deflector 5 does not have a side pylon 13 to support the wind deflector 5 mid span and does not have the saddle notch 39 of the deflector 6. For the wind deflector 5 the corner keys 10 are used to lock the top of the deflector 5 into the array. The bottom of the deflectors are held in place by the wind deflector lock tab 42 that gets inserted into the wind deflector slot 43 of the pylons 12, 13 as shown in FIG. 15. The combination of the lock tab and the installed corner keys completes the capture of the wind deflector 5. In addition, the wind deflector 5, 6 may accept ballast 7. Specifically, the ballast 7 can be installed as needed into the ballast channels 41 of the wind deflectors 5, 6. In addition, the wind deflectors 5, 6 are supported above the surface and extend along the perimeter of the array. Accordingly, the ballast 7 in the wind deflectors 5, 6 is positioned around the perimeter of the array to resist loading on the perimeter of the array. Moreover, the wind deflectors 5, 6 are spaced from the surface such that fluid may flow along the surface without being inhibited by the wind deflectors 5, 6. In addition, the wind deflectors 5, 6 are positioned substantially perpendicular to the surface to inhibit collection of fluid on the wind deflectors 5, 6.

Figure 16A:
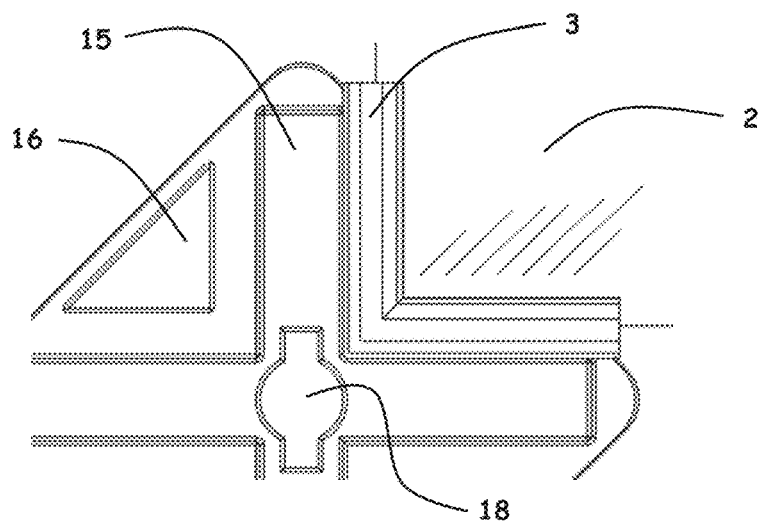
FIG. 16A is an enlarged top view of a module connected to a corner pylon.
Figure 16B:
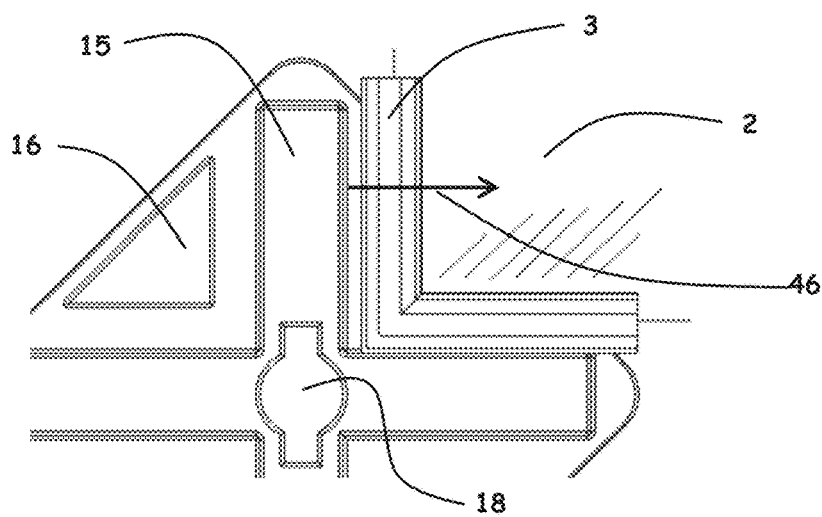
FIG. 16B is an enlarged top view of the module and corner pylon shown in FIG. 16A with the module displaced in a first plane.
Figure 16C:
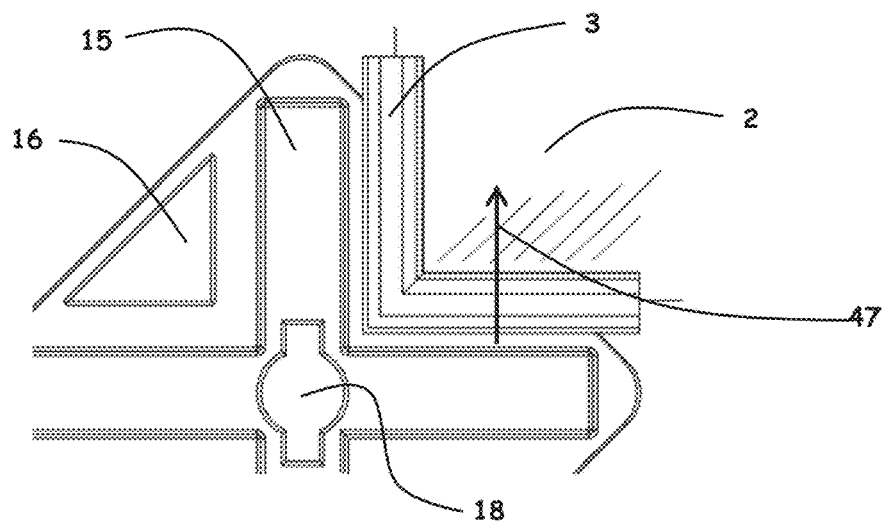
FIG. 16C is an enlarged top view of the module and corner pylon shown in FIG. 16A with the module displaced in a second plane.

The freedom of movement of the corner clips 3 in the slip channel 17 of the corner pylons 12 is shown in FIGS. 16A, 16B, & 16C which are top views of the corner pylon assembly with the corner key 10 removed. FIG. 16A shows the corner clip 3 with the module 1 positioned against the back stop 15. As shown in FIG. 16B, the clip 3 may move in a first slip direction 46 such that the corner clip 3 is spaced from the back stop 15 and positioned against the bearing block 16. As shown in FIG. 16C, the clip 3 may move in a second slip direction 47 such that the corner clip 3 is spaced from the back stop 15 and positioned against the bearing block 16. The module 1 is in an extended position in FIG. 16C. In the extended position, the corner clip 3 is positioned the greatest distance from the back stop 15 in the first slip direction 46 and the second slip direction 47. The first slip direction 46 is perpendicular to the second slip direction 47. Allowing the module 1 to have freedom of movement in both directions but at least in one direction decreases stresses on the module assembly and on the structure surface leading to a more reliable system with less damage to the structure surface and the module 1. In other embodiments, the corner clip 3 may move in any direction that enables the module 1 to function as described.

Figure 17A:
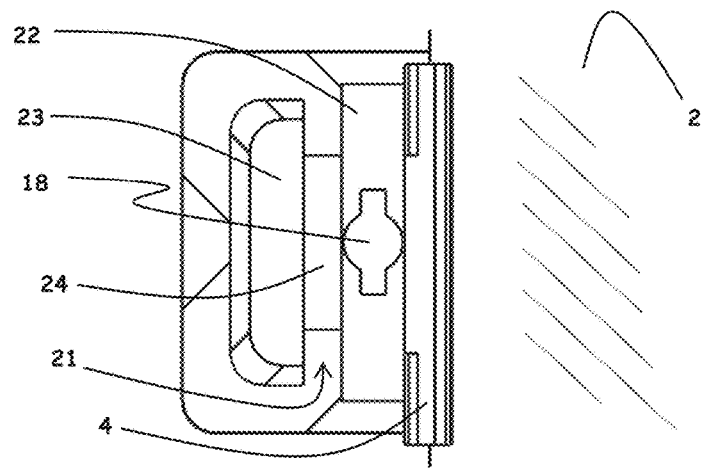
FIG. 17A is an enlarged top view of a module connected to a side pylon.
Figure 17B:
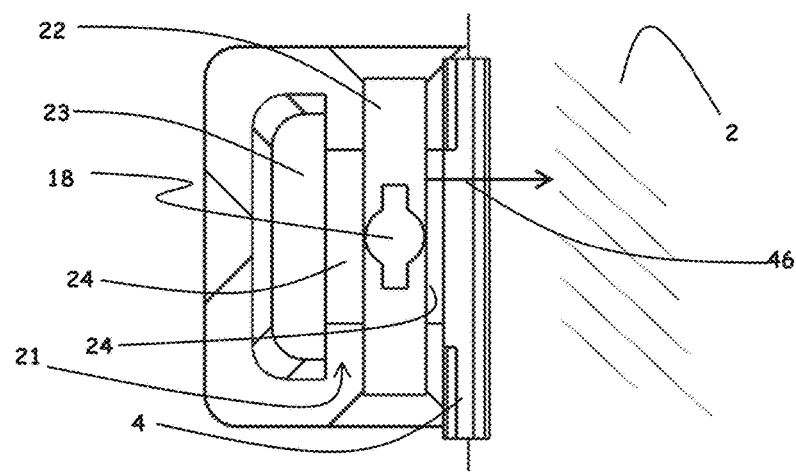
FIG. 17B is an enlarged top view of the module and corner pylon shown in FIG. 17A with the module displaced in a first plane.
Figure 17C:
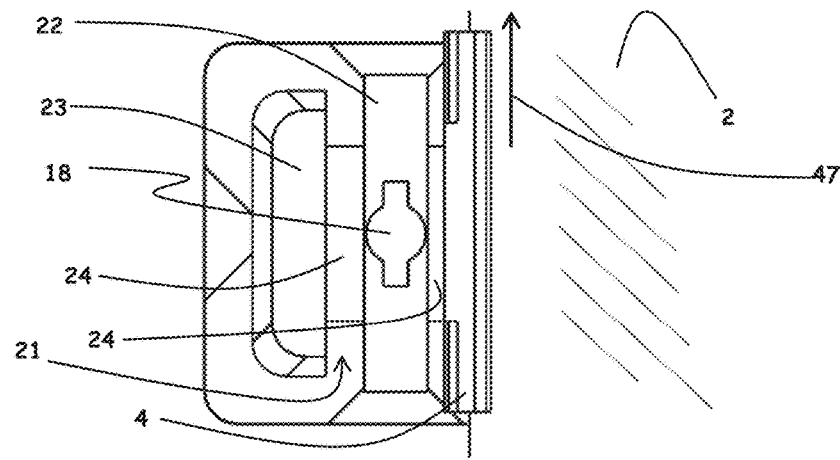
FIG. 17C is an enlarged top view of the module and corner pylon shown in FIG. 17A with the module displaced in a second plane.

The allowed freedom of movement of the side clips 4 in the slip channel 21 of the side pylons 13 is shown in FIGS. 17A, 17B, & 17 C which are top views of the side pylon assembly with the side key hidden. FIG. 17A shows the corner clip 3 with the module 1 positioned against the back stop 22. As shown in FIG. 17B, the clip 3 may move in the first slip direction 46 such that the corner clip 3 is spaced from the back stop 22 and positioned against the bearing block 23. As shown in FIG. 17C, the clip 4 may move in a second slip direction 47 such that the corner clip 3 is spaced from the back stop 22 and positioned against the saddle 24. The module 1 is in an extended position in FIG. 17C. In other embodiments, the side clip 4 may move in any direction that enables the module 1 to function as described.

The freedom of movement of each module assembly in any direction is greater than the thermal expansion/contraction of the underlying surface and/or of the module 1. Moreover, each module 1 moves independently of other modules 1. Accordingly, each module 1 can individually relieve stresses due to thermal expansion/contraction. The described embodiments differ from at least some known systems where module assemblies are coupled together rigidly such that the module assemblies expand and contract together and the entire system must account for the total expansion/contraction of the surface in relation to the system at the periphery of the array, and between the modules in the array. In contrast, the described embodiments allow the modules 1 to have individual freedom of movement, which reduces stress in the system and reduces the amount of expansion/contraction that must be taken into account at the periphery of the array as well independently relieving the stress on individual modules. Accordingly, each module 1 may be free to move an amount that is much less that the amount the entire system would have to move to account for expansion/contraction of the entire system and/or the surface.

In addition, each module 1 in the array is spaced from other modules 1 by the pylons 3, 4. In particular, the pylons 3, 4 include a spacer to keep modules at a minimum distance from each other to allow for pressure equalization. As a result, air may move between the modules 1 and the forces on the modules 1 are reduced.

In some embodiments, material may be removed from each of the components in order to save weight or cost, or for example to provide other benefits such as promoting drainage or ventilation.

With reference to FIG. 1C, during operation, the pylons 12, 13 support the modules 1, ballast 7, and the wind deflectors 5, 6 a distance above the surface and couple the modules 1, ballast 7, and the wind deflectors 5, 6 together. The pylons 12, 13 including the locked keys 10, 11 capture the modules 1 and the wind deflectors. In addition, the pylons allow for the modules 1 to move in at least one direction parallel to the surface to reduce forces that can develop from thermal expansion of the surface and/or the modules 1. The wind deflectors 5, 6 can be installed on the perimeter of the array as needed. The wind deflectors 5, 6 can accept ballast 7 to increase the stability of the array and the ability of the array to withstand wind forces. In particular, the wind deflectors 5, 6 facilitate the array resisting loads at the perimeter of the array. The electrical wires 8 are secured in wire receivers 20 on the pylons 12, 13.

Referring back to FIGS. 1C, 6A, and 7C, a method of installing the array on a surface of a structure includes assembling at least four modules 1 and connecting the modules 1 together. First, a first set of pylons 12, 13 are installed for the first module 1. Second, the ballast 7 is installed for the pylons 12, 13 supporting the first module assembly. Third, the module assembly's 1 corner and side clips 3, 4 are positioned in the slip channels 17, 21. Then a second set of pylons 12, 13 are installed for the second module 1 and the ballast 7 are installed on the pylons 12, 13. The second module 1 is positioned in the slip channels 17, 21. The two modules are electrically wired together and the wire 8 is securely mounted off the surface by inserting it into one or more of the available wire receivers 20. The side key 11 for the side pylon 13 is then installed into the pylon 13 between the modules 1 and locked into place. This process is repeated until an adjacent row (or column) is installed and four modules 1 are coupled to the corner pylons 12. The key 10 is installed into the corner pylon 12 and locked into place to secure the module assemblies to the corner pylon 12. In other embodiments, any number of module assemblies may be secured to the pylons 12, 13 that enable the array to operate as described. Once a pylon 12, 13 is full, the pylon 12, 13 is locked down by its corresponding key 10, 11. Once the array is complete, the wind deflectors 5, 6 are installed along the perimeter of the array as necessary. They are placed down onto the pylons 12, 13 such that their bearing block notches 40 and saddle notches 39 are wrapped around the bearing blocks 16, 23 of the pylons 12, 13. In addition, the wind deflector lock tabs 42 are inserted into the deflector slots 43 on the pylons. Then the keys 10, 11 are installed on the pylons 12, 13 along the perimeter of the array. Finally, any required ballast 7 are installed onto the wind deflectors 5, 6. The electrical wires 8 can extend from the array at any point by cutting through the deflector 5, 6 and installing proper conduit with fittings or bushing as identified by code. The array is now complete. In other embodiments, the array may be assembled in any manner and any sequence that enables the array to operate as described.

Figure 12:
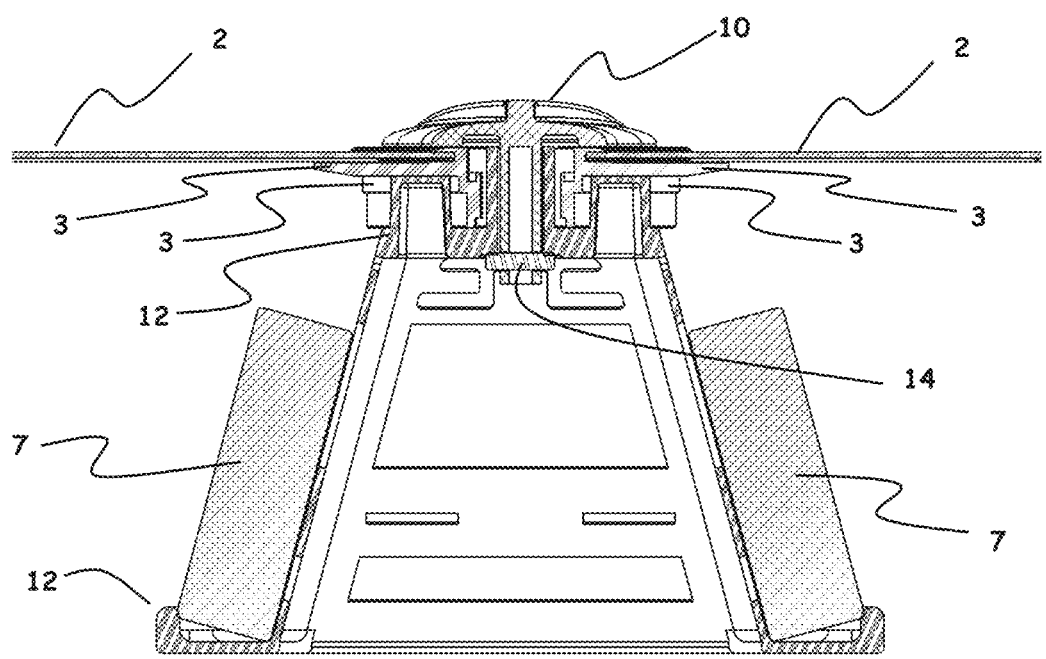
FIG. 12 is a perspective view of nested pylons.
Figure 12:
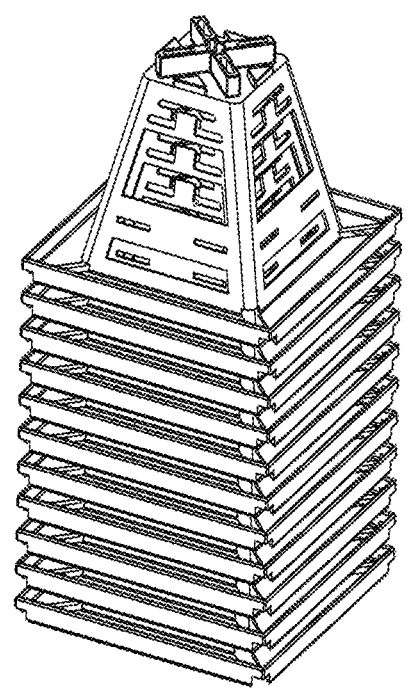

FIG. 12 is a perspective view of nested pylons. Specifically, the shape of the pylons 12, 13 allow the pylons to be nested within each other facilitate shipping and storage of the pylons 12, 13. Each pylon 12, 13 defines a cavity that is configured to receive other pylons 12, 13.

In some embodiments, the modules 1 and/or the array 100 may be assembled manually without the use of tools. For example, the keys 10, 11 allow the modules 1 to be secured to the pylons 12, 13 without the use of tools. In addition, the clips 3, 4 engage each other and the pylons 12, 13 to facilitate assembly. Moreover, components such as the ballast 7 and the wind deflectors 5, 6 may be positioned and installed by hand. Accordingly, embodiments of the array 100 and the modules 1 reduce the time and cost required to assemble solar modules and arrays.

In addition, in the illustrated embodiment, the solar array 100 is substantially planar and the laminates 1 are substantially parallel to the mounting surface. As a result, the array 100 facilitates cleaning. For example, a robotic cleaner may be used to clean the array and would experience less obstacles because the array is planar. In addition, the configuration of the modules 1 allows for water, snow, and other fluids to drain from the array 100. For example, the modules 1 are frameless and the clips 3, 4 are positioned to allow water flow along edges of the module and inhibit water collecting along the edges. In addition, the pylons 12, 13 include drainage slots 38 to facilitate drainage of fluid. In other embodiments, at least some of the modules 1 may be positioned at angles.

Embodiments of the methods and systems described achieve superior results compared to prior methods and systems. For example, the systems and methods described simplify the installation of solar modules on structures. More specifically, the embodiments reduce the labor, tools, and materials required for layout and assembly of the solar modules. In addition, the embodiments described include keys and clips that provide freedom of movement for the modules and reduce stresses on the modules. Also, the solar modules distribute loads and reduce point loading on the structure surface.

When introducing elements of the present invention or the embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A solar array mounted on a surface of a structure, the surface being planar, the solar array comprising:
   a solar module;
   a support that supports the solar module a distance above the surface, wherein the support defines a channel to receive the solar module; and
   a locking mechanism engaging the support to secure the solar module to the support, wherein the solar module extends between the support and the locking mechanism and into the channel such that the solar module is allowed to move relative to the support in a first plane parallel to the surface when the solar module is secured to the support, wherein the locking mechanism and the support inhibit movement of the solar module in a second plane perpendicular to the surface when the solar module is secured to the support.

2. The solar array of claim 1, wherein the support is free to move a fixed distance in the first plane.

3. The solar array of claim 2, wherein the solar module is allowed to move a fixed distance in the first plane.

4. The solar array of claim 1, wherein the support includes a keyway, and wherein the locking mechanism includes a key that extends into the keyway and engages the support to secure the solar module to the support.

5. The solar array of claim 4, wherein the key is configured to be operated manually without the use of a tool.

6. The solar array of claim 1 further comprising ballasts removably located in channels in the support, and wherein the ballasts are substantially perpendicular to the structure surface when the ballasts are in the channels.

7. The solar array of claim 1 further comprising a second support and a wind deflector that attaches to and extends between the supports, wherein the wind deflector is supported a distance above the surface by the supports, and wherein the wind deflector is allowed to move in the first plane a fixed distance when the wind deflector is attached to the supports.

8. The solar array of claim 1 further comprising a plurality of the supports to provide at least two points of support for the solar module on the structure surface, wherein each support is located at a corner of the solar module or mid-span along edges of the solar module.

9. The solar array of claim 1 further comprising a plurality of the modules, wherein the modules are secured to the support such that the modules are allowed to move in the first plane relative to each other.

10. The solar array of claim 9, wherein the support has a spacer to keep modules at a minimum distance from each other to allow for pressure equalization.

11. The solar array of claim 1, wherein the module allows water flow along edges of the module and inhibits water collecting along the edges.

12. A method of assembling frameless solar modules, the method comprising:
   attaching a first set of clips to a first laminate;
   securing the first set of clips on the first laminate in a position, wherein the first set of clips are positioned to extend between a support and a locking mechanism of a solar array and into a channel of the support such that the first laminate is allowed to move relative to the support in a first plane parallel to a surface when the first laminate is secured to the support, wherein the locking mechanism and the support inhibit movement of the first laminate in a second plane perpendicular to the surface when the first laminate is secured to the support;
   attaching a second set of clips on a second laminate; and
   stacking the second laminate on the first laminate such that the first set of clips engage the second set of clips, wherein the first set of clips and the second set of clips align when the second laminate is stacked on the first laminate.

13. The solar array of claim 4, wherein the key has an unlocked position in which the key is inserted into the keyway and a locked position in which the key extends into the keyway and secures the solar module to the support.

14. The solar array of claim 13, wherein the key further comprises a visible top that extends over the solar module when the key is in the unlocked position, wherein each of the locked position and unlocked position are visible after installation.

15. The solar array of claim 14, further comprising an electronic controller configured to detect if a key is in the unlocked position based on a reduction in voltage, current, or power due to the key shading the solar module and thereby enabling remote detection of the key in the unlocked position.

16. The solar array of claim 1, wherein the support includes a pylon, the solar array comprising a plurality of the pylons, wherein each pylon is shaped to enable nesting of pylons with respect to one another for compact shipping of the pylons.

17. The solar array of claim 1 further comprising:
   clips attached to a laminate of the solar module, wherein the clips extend between the support and the locking mechanism and engage the support.

18. The solar array of claim 17, wherein the clips include side clips and corner clips.

19. The solar array of claim 18, wherein the support includes a saddle configured to receive the clips.

20. The solar array of claim 17, wherein the clips, the support, and the locking mechanism are electrically insulative so that no electrical grounding of the solar array is required.

21. The solar array of claim 17, wherein the solar module is a first solar module, and the clips are a first set of clips, the solar array further comprising:
   a second solar module including a laminate; and
   a second set of clips attached to the laminate of the second solar module, wherein the first set of clips engage the second set of clips, the first set of clips and the second set of clips facilitating assembly, shipping and installation of the solar modules.

22. The solar array of claim 21, wherein the first set of clips and the second set of clips lock together when the solar modules are stacked for shipment, each clip of the second set of clips including a tongue that is captured in a groove of the first set of clips.

23. The solar array of claim 21, wherein the first set of clips align with the second set of clips to align the first and second solar modules.

24. The solar array of claim 21, wherein the clips are configured to mount the solar modules to a support when the solar modules are assembled to form an array.

* * * * *